US008847169B2

(12) United States Patent
Yuan et al.

(10) Patent No.: US 8,847,169 B2
(45) Date of Patent: Sep. 30, 2014

(54) QUANTUM-LIMITED HIGHLY LINEAR CMOS DETECTOR FOR COMPUTER TOMOGRAPHY

(75) Inventors: Jie Yuan, Hong Kong (CN); Bing Liu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 449 days.

(21) Appl. No.: 13/115,681

(22) Filed: May 25, 2011

(65) Prior Publication Data

US 2011/0291019 A1 Dec. 1, 2011

Related U.S. Application Data

(60) Provisional application No. 61/344,105, filed on May 25, 2010.

(51) Int. Cl.
*H01L 27/146* (2006.01)

(52) U.S. Cl.
USPC ............................... 250/370.09; 250/370.08

(58) Field of Classification Search
USPC ...................................... 250/370.09, 370.08
See application file for complete search history.

(56) References Cited

U.S. PATENT DOCUMENTS

| 5,773,832 | A | 6/1998 | Sayed et al. |
|---|---|---|---|
| 5,962,856 | A | 10/1999 | Zhao et al. |
| 6,175,383 | B1 | 1/2001 | Yadid-Pecht et al. |
| 6,700,126 | B2 | 3/2004 | Watanabe |
| 6,741,198 | B2 | 5/2004 | McIlrath |
| 6,844,896 | B2 * | 1/2005 | Henderson et al. ........... 348/241 |
| 6,927,796 | B2 | 8/2005 | Liu et al. |
| 6,975,355 | B1 | 12/2005 | Yang et al. |
| 7,397,509 | B2 | 7/2008 | Krymski |
| 7,443,427 | B2 | 10/2008 | Takayanagi |
| 7,488,946 | B2 | 2/2009 | Hennessy et al. |
| 7,504,638 | B2 | 3/2009 | Alving et al. |
| 7,645,998 | B2 | 1/2010 | Danzer et al. |
| 2008/0001736 | A1 | 1/2008 | Steadman et al. |
| 2008/0036888 | A1 | 2/2008 | Sagawa et al. |
| 2010/0104159 | A1 | 4/2010 | Hirokawa et al. |
| 2010/0140732 | A1 * | 6/2010 | Eminoglu et al. ............ 257/447 |

OTHER PUBLICATIONS

Huang et al., A 0.18-μm CMOS Array Sensor for Integrated Time-Resolved Fluorescence Detection, May 2009, IEEE Journal of Solid-State Circuits, vol. 44, pp. 1-31.*

(Continued)

*Primary Examiner* — Christine Sung
(74) *Attorney, Agent, or Firm* — Leydig, Voit & Mayer, Ltd.

(57) ABSTRACT

The invention provides a CMOS CT detector design with high linearity, quantum-limited noise, good scalability, high fill factor with a single CMOS chip utilizing synchronous partial quantization. The CMOS CT detector includes a pixel array, digital column buses, analog column buses, column processing circuits, a shift register, a control signal generation circuit, and a reference generation circuit, and implements a synchronous partial quantization scheme with reset, integration and analog readout phases. Each pixel of the pixel array further includes a photodiode; an integration capacitor; an OPAMP; a reset switch; a comparator; a 1-bit dynamic random-access-memory (DRAM) cell; a circuit block for enabling subtraction of a substantially fixed amount of charge from the integrated photocharge if the integrated photovoltage increases beyond the reference voltage; an integration node; an analog buffer; and a switch coupled between the output of the DRAM cell and the digital column bus. The inclusion of a level-shifter and a current front-end improves the linearity of the detector.

19 Claims, 27 Drawing Sheets

(56) References Cited

OTHER PUBLICATIONS

Kalendar et al., Computed Tomography: Fundamentals, System Technology, Image Quality, Application, Aug. 2011, pp. 69-73 and 138-140.*

Liu et al., "A wide dynamic range high linearity in-pixel data acquisition front-end for computed tomography," in Proc. IEEE Int. Symp. Circuits Syst., 2301-2304 (Taipei, Taiwan, May 24-27, 2009).

Snoeij et al., "A CMOS imager with column-level ADC using dynamic column fixed-pattern noise reduction", IEEE J. Solid-State Circuits, 41 (12): 3007-3015 (Dec. 2006).

Wen et al., "A preliminary study on the knowledge-based delineation of anatomical structures for whole body PET-CT Studies," May 2008, Proceedings of the 5th International Conference on Information Technology and Application in Biomedicine, in conjunction with the 2nd International Symposium & Summer School on Biomedical and Health Engineering, IEEE, Shenzhen, China.

Fessler et al., "An ultra low noise multi-channel integrated readout for X-rays multi-detectors," Feb. 1994, Nuclear Instruments & Methods in Physics Research, Section A, pp. 213-219, Elsevier Science B.V., Amsterdam, Netherlands.

Grybos et al., "Development of a Fully Integrated Readout System for High Count Rate Position-Sensitive Measurements of X-Rays Using Silicon Strip Detectors," Jun. 2001, IEEE Transactions on Nuclear Science, vol. 48, No. 3, Krakow, Poland.

Huang et al., "A CMOS IC for X-Ray Computed Tomography," 1998, Proceedings of the 24th European Solid-State Circuits Conference, IEEE, New York, New York.

Luhta et al., "Back Illuminated Photodiodes for Multislice CT," Medical Imaging 2003: Physics of Medical Imaging, Proceedings of SPIE, vol. 5030, 2003.

Kavusi et al., "Architectures for High Dynamic Range, High Speed Image Sensor Readout Circuits," 2006, IFIP, Laxenburg, Austria.

Wirth et al., "Impact of Photon Transport Properties on the Detection Efficiency of Scintillator Arrays," 2006, IEEE Nuclear Science Symposium Conference Record, IEEE, New York, New York.

Spies et al., "Performance of Prototype Modules of a Novel Multislice CT Detector Based on CMOS Photosensors," Medical Imaging 2003: Physics of Medical Imaging, Proceedings of SPIE, vol. 5030, 2003.

Onishi et al., "Material Discriminated X-Ray CT by Using Conventional Microfocus X-Ray Tube and CdTe Imager," 2007, IEEE Nuclear Science Symposium Conference Record, IEEE, New York, New York.

Yuan et al.,"An Activity-Triggered 95.3dB DR—75.6dB THD CMOS Imaging Sensor With Digital Calibration", Oct. 2009, IEEE Journal of Solid-State Circuits, vol. 44, pp. 2834-2843, IEEE, New York, New York.

Agi et al., "A Pipelined VLSI Chip Architecture for Real-Time Computed Tomography of Fan-Beam Data," 1992, Solid-State Circuits Research Laboratory, IEEE, New York, New York.

Baumer et al., "Design and Evaluation of a CMOS-Photosensor with In-Pixel Sigma-Delta Modulator for X-ray Computed Tomography," 2006, IEEE, New York, New York.

Boles et al., "A Multimode Digital Detector Readout for Solid-State Medical Imaging Detectors," May 1998, IEEE Journal of Solid-State Circuits, vol. 33, No. 5, IEEE, New York, New York.

Chan et al., "A Low-Distortion and Wide Dynamic Range CMOS Imager for Wireless Capsule Endoscopy," 2008, Department of Electronic and Computer Engineering, Hong Kong University of Science and Technology, IEEE, New York, New York.

Kim et al., "Cascade Modeling of Pixelated Scintillator Detectors for X-Ray Imaging," Jun. 2008, IEEE Transactions on Nuclear Science, vol. 55, No. 3, New York, New York.

McIlrath, Lisa G., "A Low-Power Low-Noise Ultrawide-Dynamic-Range CMOS Imager with Pixel-Parallel A/D Conversion," May 2001, IEEE Journal of Solid-State Circuits, vol. 36, No. 5, New York, New York.

Vogtmeier et al., "CMOS Compatible Through Wafer Interconnects for Medical Imaging Detectors," 2007, IEEE Nuclear Science Symposium Record, IEEE, New York, New York.

Yang et al., "A 640 { 512 CMOS Image Sensor with Ultrawide Dynamic Range Floating-Point Pixel-Level ADC," Dec. 1999, IEEE Journal of Solid-State Circuits, vol. 34, No. 12, New York, New York.

Yuan et al., "Digital calibration technique for highly linear wide dynamic range CMOS imaging sensor," Apr. 2009, Electronic Letters, vol. 45, No. 9, IET, London, England.

Steadman et al., "A High Dynamic Range Current-Mode Amplifier for Computed Tomography," 2006, IEEE Journal of Solid-State Circuits, vol. 41, No. 7, IEEE, New York, New York.

Steadman et al., "A CMOS Photodiode Array With In-Pixel Data Acquisition System for Computed Tomography," Jul. 2004, IEEE Journal of Solid-State Circuits, vol. 39, No. 7, IEEE, New York, New York.

* cited by examiner

QUANTUM-LIMITED HIGHLY LINEAR CMOS DETECTOR FOR COMPUTER TOMOGRAPHY

CROSS-REFERENCE TO RELATED APPLICATIONS

This patent application claims the benefit of U.S. Provisional Patent Application No. 61/344,105, filed May 25, 2010, which is incorporated by reference.

BACKGROUND OF THE INVENTION

X-ray computed tomography (CT) is one of the major diagnostic imaging modalities. A multi-slice CT apparatus obtains projection data of an object by irradiating cone X-ray beams and measures the X-rays which have passed through the object by an X-ray detector. As shown in FIG. 1, an X-ray CT apparatus mainly includes an X-ray source 100, a 2-dimensional X-ray detector 101, and a control console 102. The projection data is acquired in discrete positions of the X-ray source in one rotation. The tomographic images of the object can be reconstructed by performing back projection on the projection data.

X-ray CT detectors are mainly based on indirect conversion. FIG. 2 shows the impinging X-ray photons are converted into visible photons by a phosphor or scintillating screen 104, such as cesine iodine (CsI), which is followed by a visible light digital imaging sensor 105 to acquire the X-ray projection data. Two major types of visible light imaging sensors are used in existing CT apparatus. One type is flat-panels based on thin-film transistors (TFT). Another type of CT detector is based on charge coupled devices (CCD). Both types of CT detectors require external CMOS (complementary metal-oxide-semiconductor) integrated circuits including high-resolution analog-to-digital converters (ADC) to process the photo charge. The CCD imaging sensor also has limited dynamic range.

CMOS-based CT detectors have been demonstrated with read-out noise lower than the incident X-ray photon shot noise, which is sufficient for the CT application. Nonetheless, the linearity of the CMOS-based detectors is low, which causes artifacts to appear after the image reconstruction. Another disadvantage is that CMOS-based CT detectors also require external high-resolution ADC to quantize the integrated photo charge.

Wide dynamic range (WDR) CMOS image sensors (CIS) can be designed to quantize the WDR with only low-resolution ADCs at the column level, which can be integrated on the same CMOS chip as the sensing pixel array in asynchronous partial quantization schemes, as depicted by FIGS. 3A and 3B. When photo voltage $V_n$ exceeds some potential $V_{ref}$, the pixel resets. The voltage change is generally referred as the potential well $V_w$. At the end of a frame, the residual voltage $V_r$ is quantized by a low resolution ADC to $D_r$. The photo current $I_{ph}$ can be calculated by Eq. (1) below:

$$I_{ph}=C_{int}/T_{int} \cdot V_n=C_{int}/T_{int} \cdot (D_w \cdot V_w + D_r \cdot LSB_0) \quad (1)$$

where $T_{int}$ is the integration duration, $D_w$ is the self-reset number of the frame, $LSB_0$ is the ADC least significant bit size, and $C_{int}$ is the integration capacitance. This scheme can improve the dynamic range of a 3T active pixel sensor (APS) by $D_w$ times. Eq. (1) shows the linearity of the scheme depends on the uniformity of the potential well $V_w$. $V_w$ has variations due to the signal-dependent comparator offset and delay time. Nonlinearity of the CIS with the asynchronous partial quantization architecture is a problem that exists with many WDR CIS schemes (e.g. self-resetting and time-to-saturation schemes). Nonlinearity can be compensated well through calibration because the nonlinearity is mainly caused by the potential well size variation, but calibration is not desirable for real-time applications, such as CT.

In summary, existing flat panel-based, CCD-based and CMOS-based CT detectors generally have high packaging and system design complexity, which adds to the high CT equipment cost. Existing CMOS CT scanners also have low linearity, which leads to artifacts after image reconstruction, or require calibration, which is undesirable for real-time applications.

Accordingly, it is an object in part of the present invention to provide a novel CMOS CT detector design to overcome weaknesses and drawbacks of prior art CT scanners, which is to provide CT scanners with high linearity, quantum-limited noise, good scalability, high fill factor with a single CMOS chip, and without requiring calibration. However, while this is an object underlying certain implementations of the invention, it will be appreciated that the invention is not limited to systems that solve the problems noted herein. Moreover, the inventors have created the above body of information merely for the convenience of the reader; the foregoing is a discussion of problems discovered and/or appreciated by the inventors, and is not an attempt to review or catalog the prior art.

BRIEF SUMMARY OF THE INVENTION

The invention provides a CMOS CT detector design with high linearity, quantum-limited noise, good scalability, high fill factor with a single CMOS chip utilizing synchronous partial quantization. In one embodiment, the CMOS CT detector includes: a pixel array including a plurality of pixels arranged into at least one column; at least one digital column bus corresponding to the at least one column; at least one analog column bus corresponding to the at least one column; at least one column processing circuit corresponding to the at least one column for processing digital and analog outputs received from the at least one digital column bus and the at least one analog column bus; a shift register for multiplexing outputs of at least two column processing circuits; a control signal generation circuit for generating controls signals for at least one of the plurality of pixels, the shift register, and the at least one column processing circuit; and a reference generation circuit for generating voltage and current references for at least one of the at least one column processing circuit and the plurality of pixels. In a synchronous partial quantization scheme, the pixel array operates in three exclusive clock phases including a reset phase, an integration phase and an analog readout phase corresponding to three control signals including a reset control signal, an integration control signal and an analog readout control signal.

A pixel in the pixel array may further include: a photodiode for generating a photocurrent; an integration capacitor for integrating the photocurrent into a photovoltage; an operational amplifier for establishing feedback to force the photocurrent to be integrated on the integration capacitor; a reset switch for resetting the integration capacitor during a reset phase; a comparator for comparing an integrated photovoltage with a reference voltage; a 1-bit dynamic random-access-memory (DRAM) cell for recording the output of the comparator synchronously to a system clock; a circuit block for enabling subtraction of a substantially fixed amount of charge from the integrated photocharge if the integrated photovoltage increases beyond the reference voltage; an integration node connected to the input of the operation amplifier and to the integration capacitor; an analog buffer for receiving the integrated photovoltage and for driving the analog column bus at the end of an integration phase; and a switch coupled between the output of the DRAM cell and the digital column bus for driving the digital column bus during the integration phase. The circuit block for enabling subtraction may further comprise: a non-overlapping clock generation module for generating two non-overlapping clocks with utilizing the gated output from the DRAM; two switches and a sampling capacitor for absorbing a substantially fixed amount of charge from the integration capacitor at a time where the photovoltage exceeds the reference voltage; and a level shifter coupled between the integration node and the charging node of the sampling capacitor for charging the sampling capacitor according to the voltage at the integration node. The level shifter may further comprises two branches of MOS diodes with two current sources for generating a substantially fixed voltage level shift.

In a further embodiment, the pixel further comprises a current front-end coupled between the integration node and the photodiode for decoupling the photodiode capacitance from the integration node. The current front-end may further comprise a gain-boosted cascode transistor for decoupling the photodiode and the integration node in the reset and integration phases; an identical branch for biasing said photodiode during an analog readout phase; and a small current source for expediting pixel settling during the reset phase. The cascode transistor may be turned off during the analog readout phase.

In yet another further embodiment, the 1-bit DRAM further comprises a pass transistor for receiving the comparator output by the control of the system clock; a capacitor for storing the comparator output; a reset switch for resetting the capacitor controlled by a DRAM reset signal; and an AND gate for gating the output of the 1-bit DRAM cell with the system clock. The 1-bit DRAM may be designed such that the pass transistor has strong write capability, and the reset switch has weak reset capability.

In yet another further embodiment, the column processing circuit comprises: a quantizing analog-to-digital converter (ADC) coupled to the analog column bus for quantizing the photovoltage in a pixel to n bits at the end of an integration phase; and a column counter coupled to the digital column bus for counting a number of self-resets for pixels in the at least one column. The column counter may further comprise an array of m-bit static random-access-memory (SRAM) cells for storing the self-reset number of every the pixel; an m-bit adder for receiving a digital signal from the digital column bus and for receiving digital values from the SRAM array; an m-bit register for latching a summed value from the m-bit adder at the falling edge of a counter clock; m inverters coupled to the m-bit register; a BIT bus coupled to one terminal of each SRAM cell including m bit lines; a BIT* bus coupled to another terminal of each SRAM cell including m bit lines; m switches coupled between the m-bit register and the BIT bus controlled by a column write signal; m switches coupled between the inverters and the BIT* bus controlled by the column write signal; and m switches coupled between the BIT bus and BIT* bus controlled by an equalization signal.

The SRAM cell may further comprise: two cross-coupled inverters forming two internal nodes; a switch coupled between a first internal node and a bit line in the BIT bus controlled by an SRAM signal; and a switch coupled between a second internal node and a bit line in the BIT* bus controlled by the SRAM signal. SRAM signals may open an SRAM cell for both reading and writing in the counter clock cycle and may open different SRAM cells sequentially, and the equalization signal may equalize the BIT bus and the BIT* bus before an SRAM signal open the SRAM cells. The SRAM cell may further be reset by a register reset signal in the counter clock.

Other objects and advantages of the invention will become apparent upon reading the following detailed description and upon reference to the drawings.

BRIEF DESCRIPTION OF THE SEVERAL VIEWS OF THE DRAWING(S)

Figure 12:
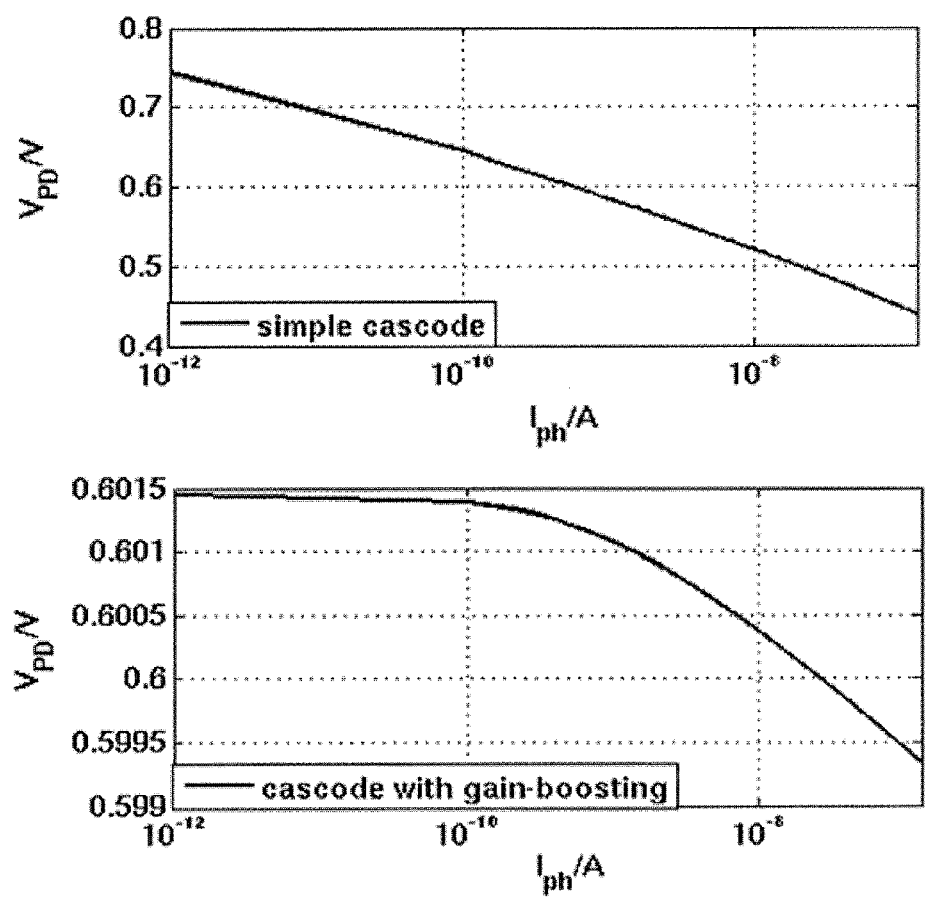
Figure 13:
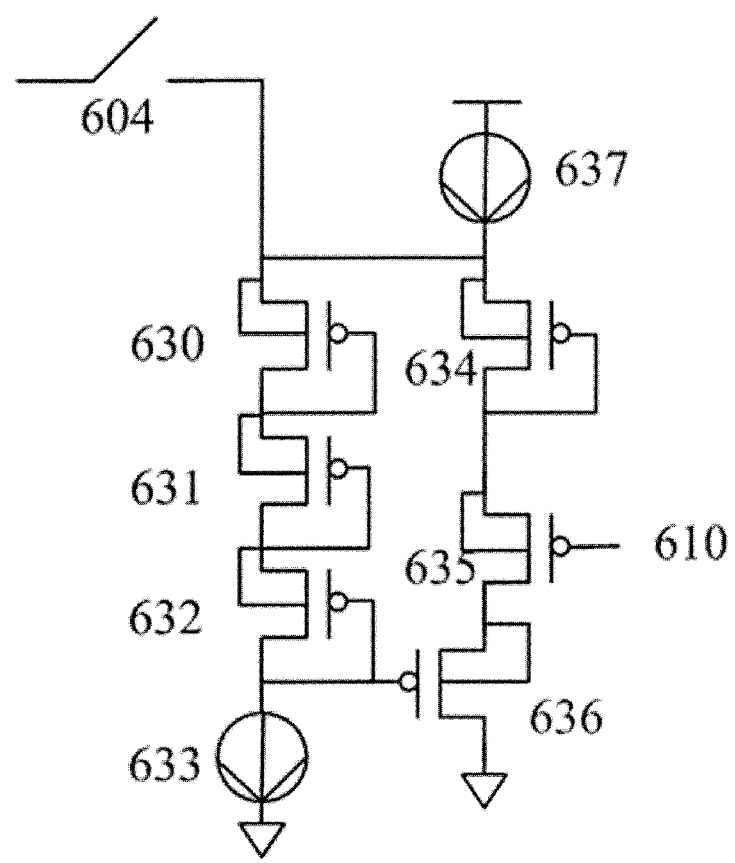
Figure 14:
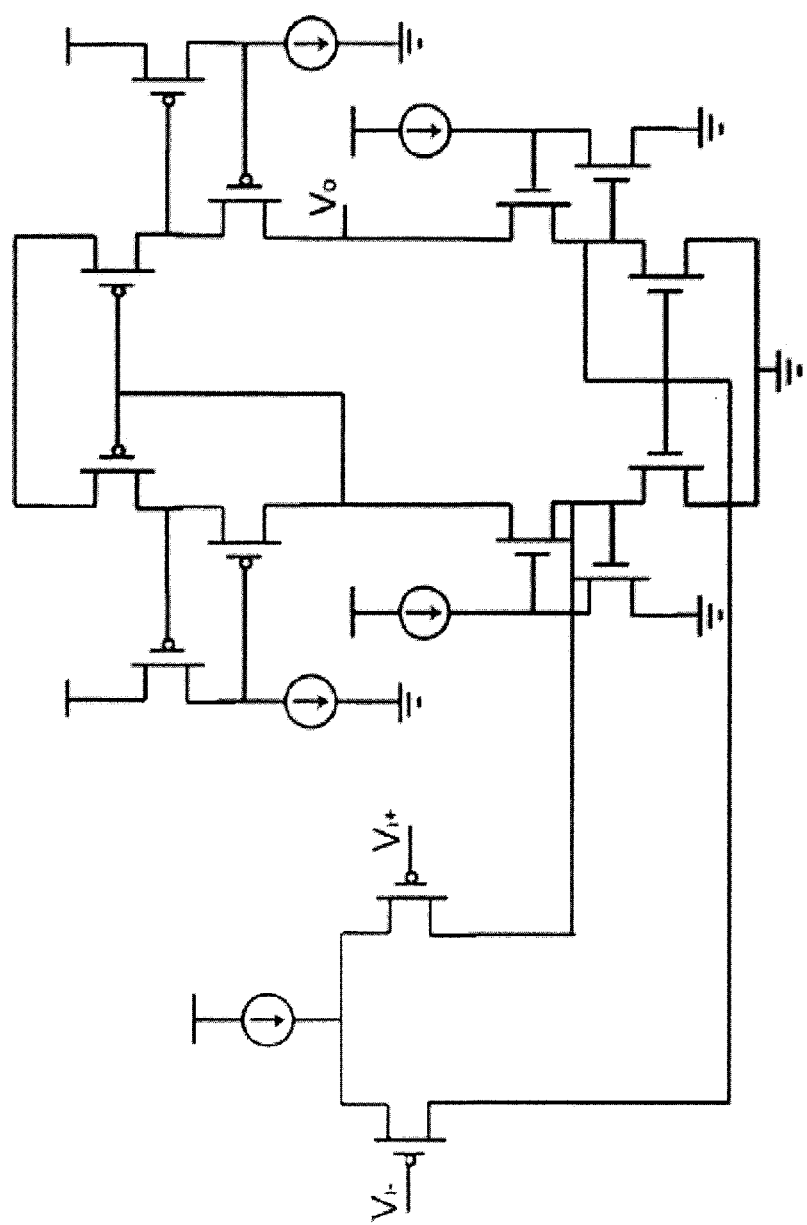
Figure 15:
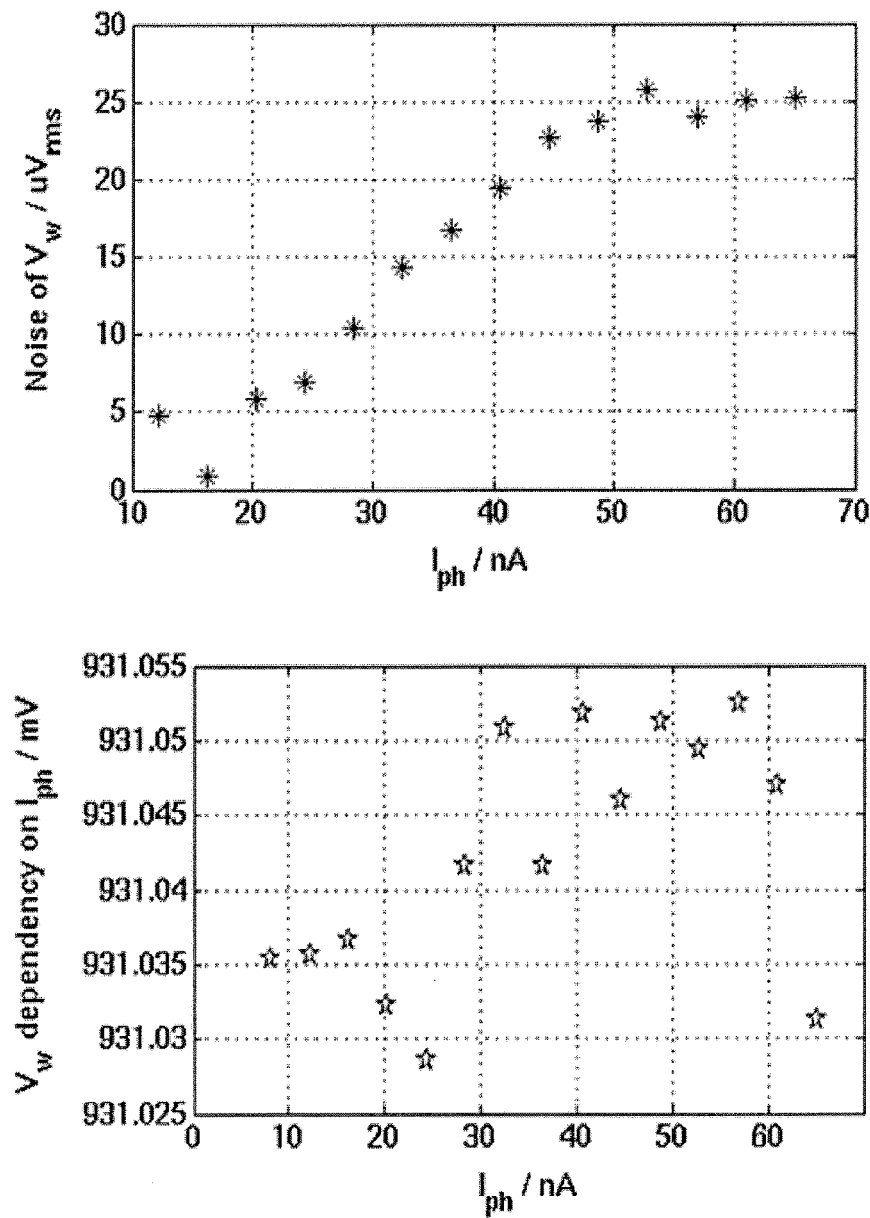
Figure 16:
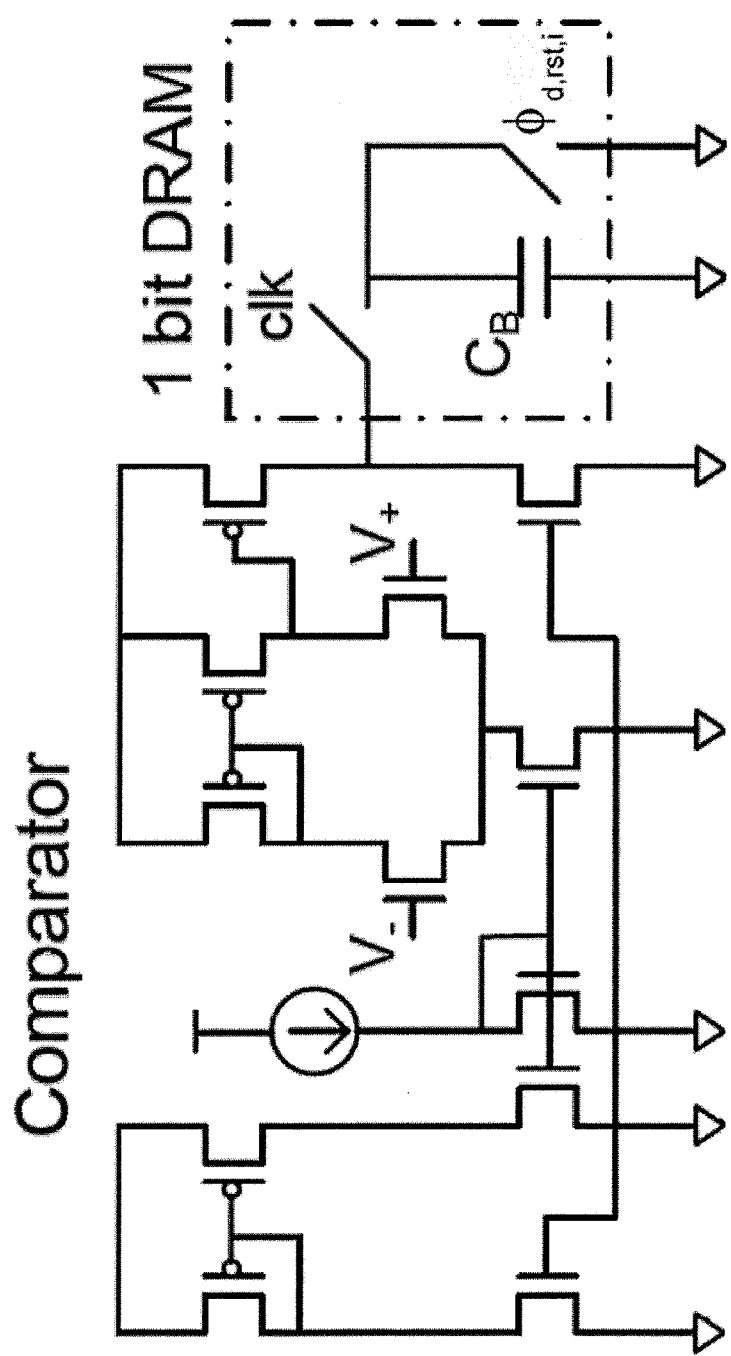
Figure 17:
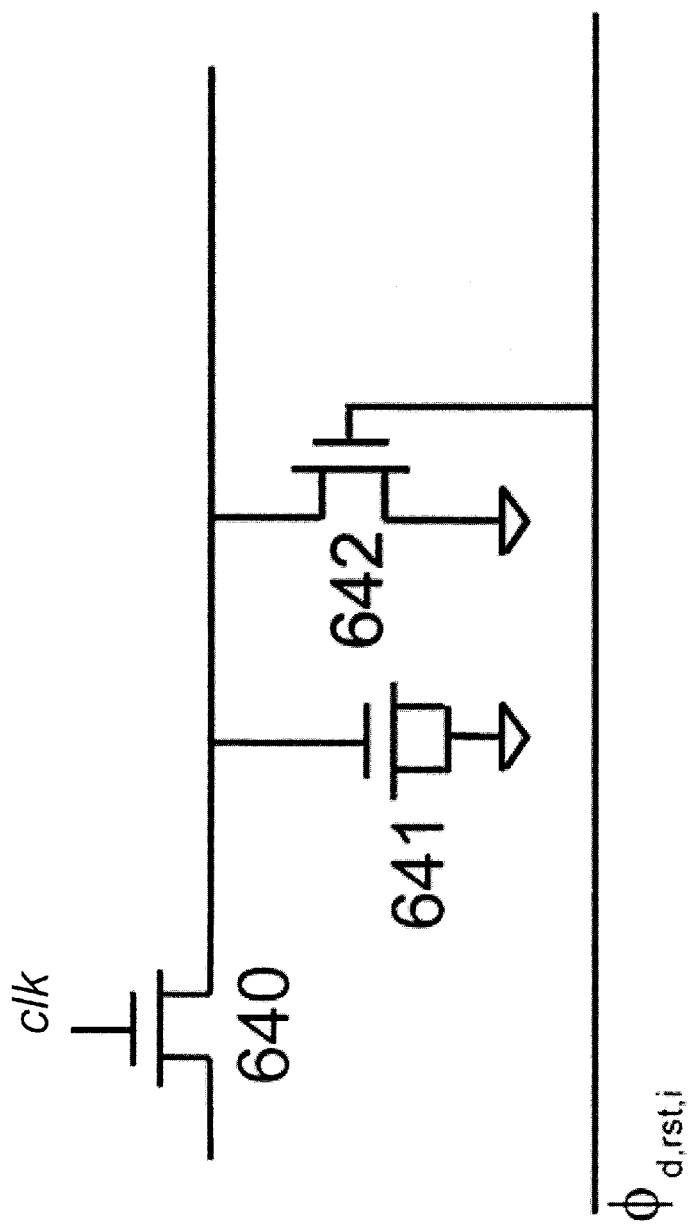
Figure 18:
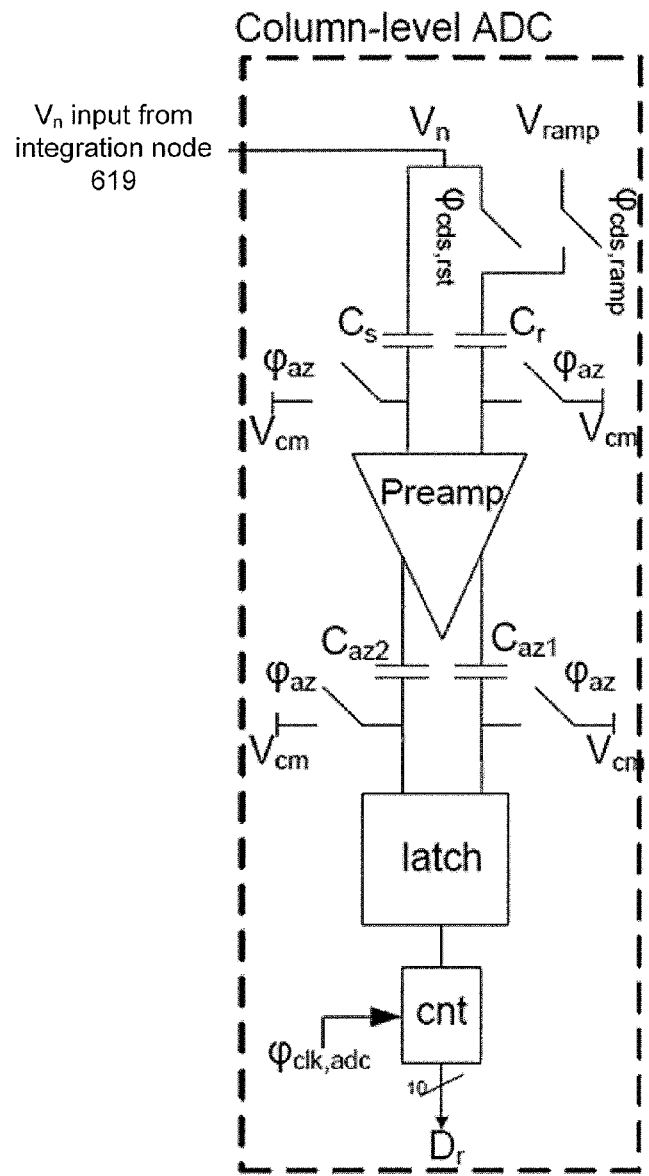
Figure 19:
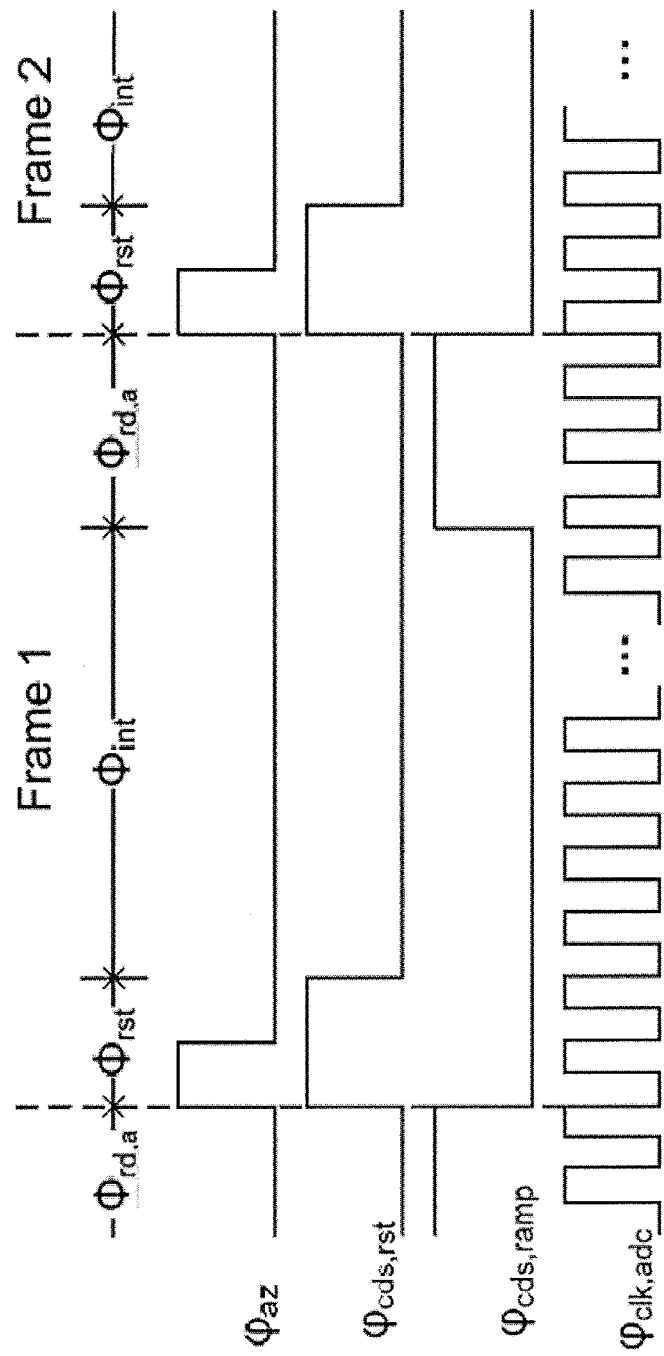
Figure 20:
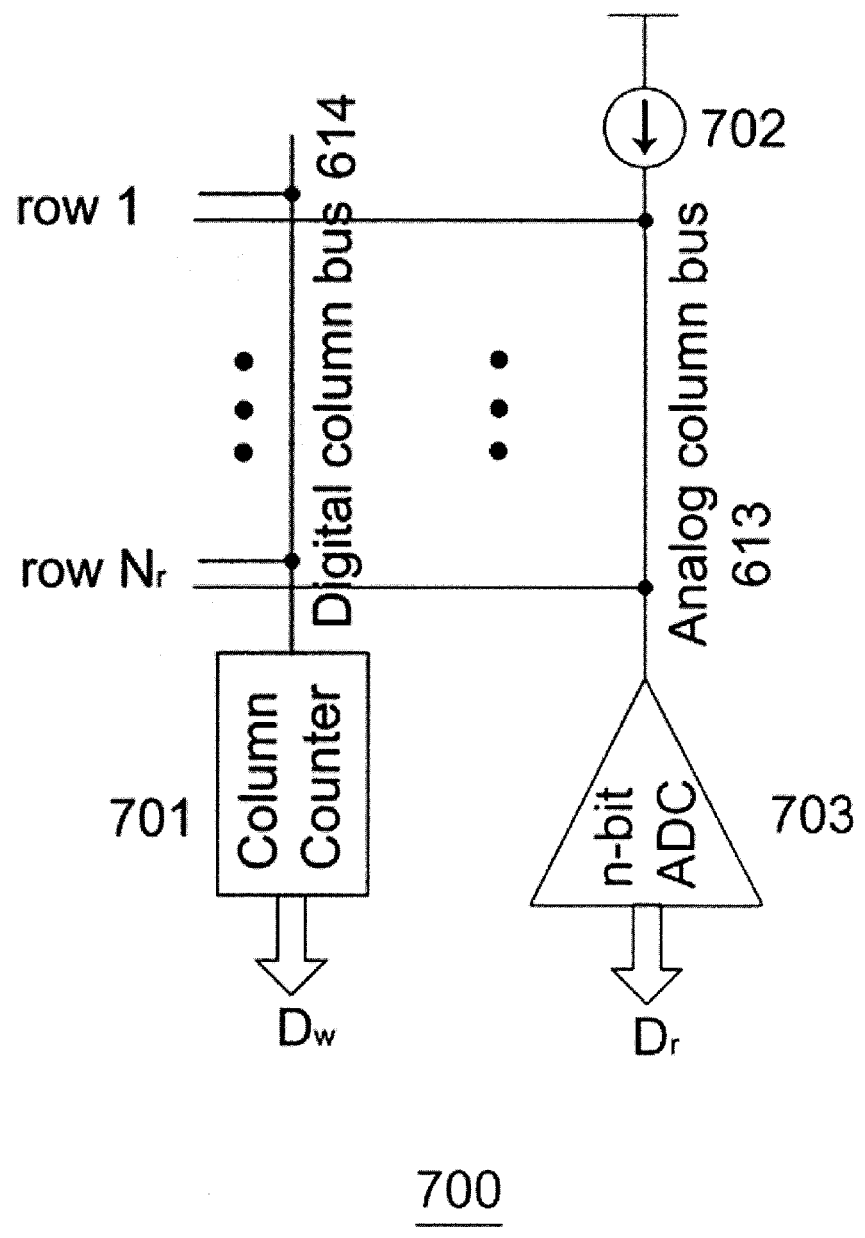
Figure 21:
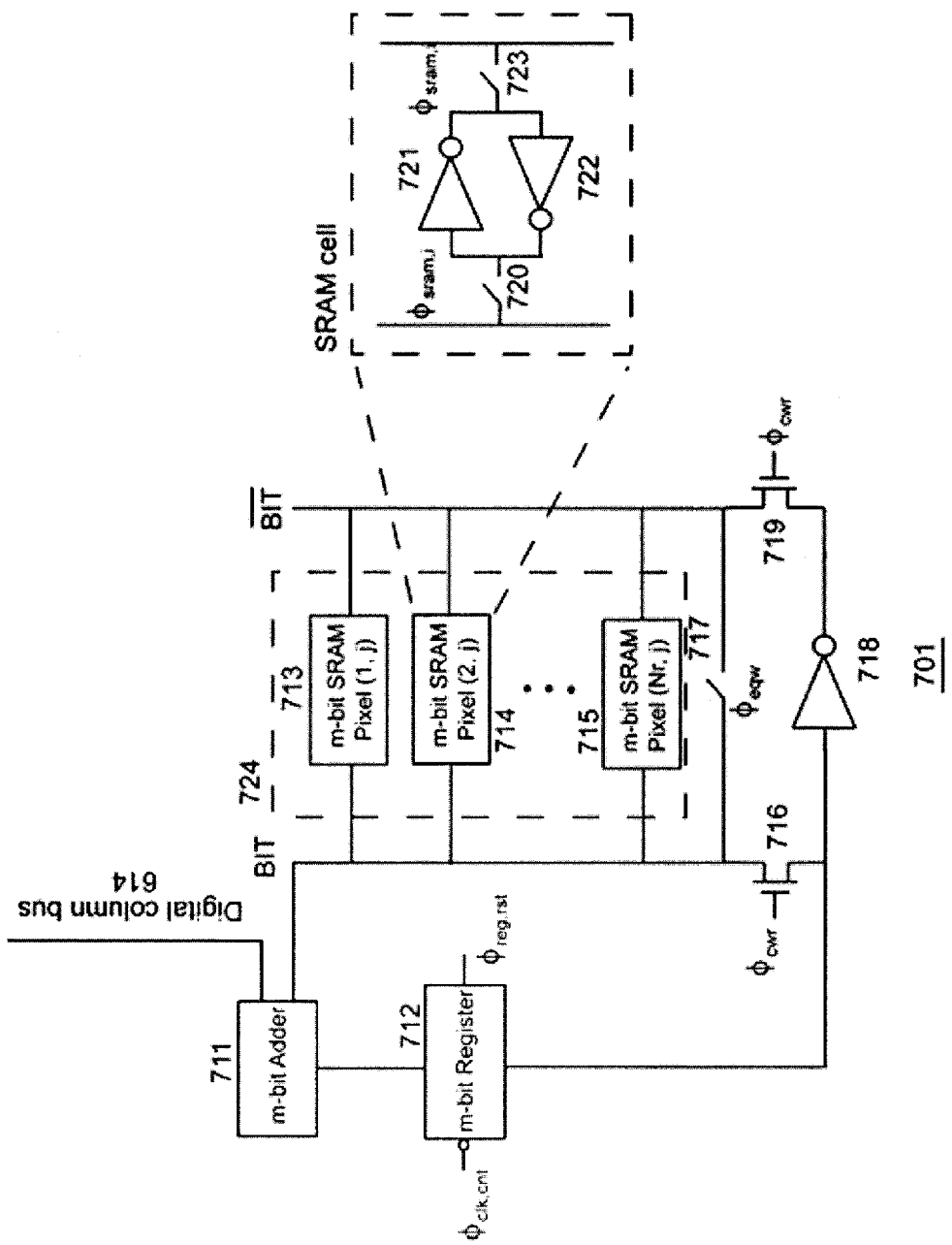
Figure 22:
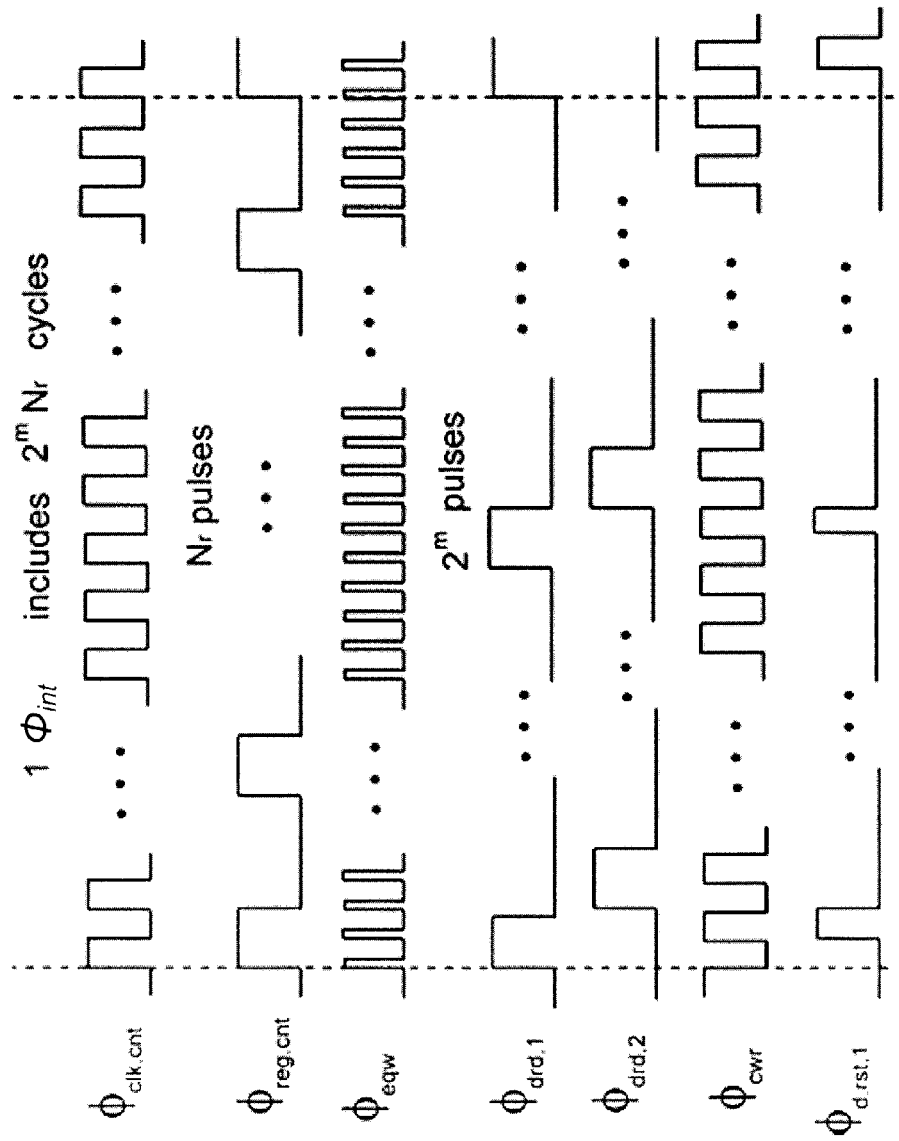
Figure 23:
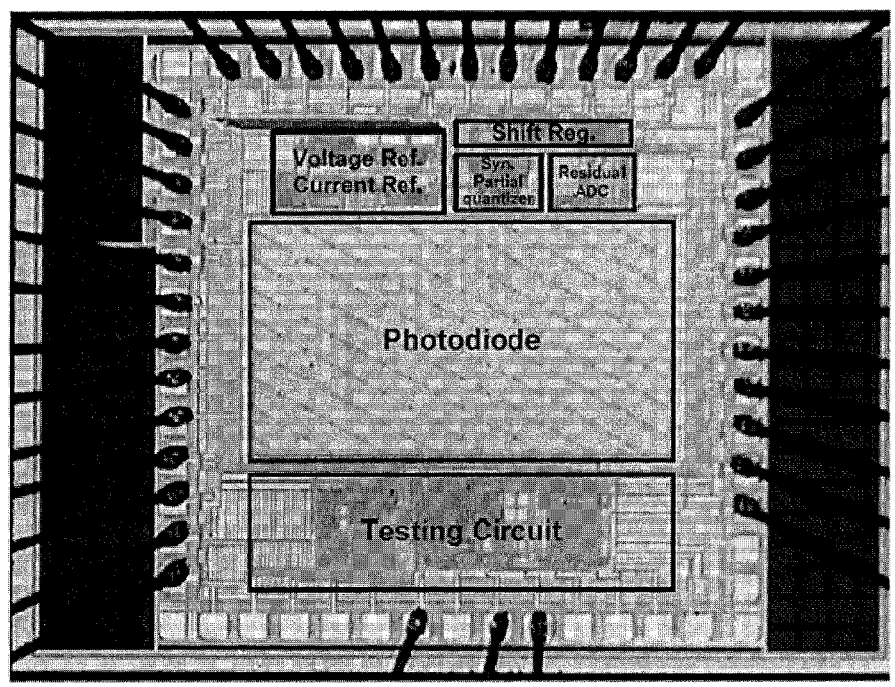
Figure 24:
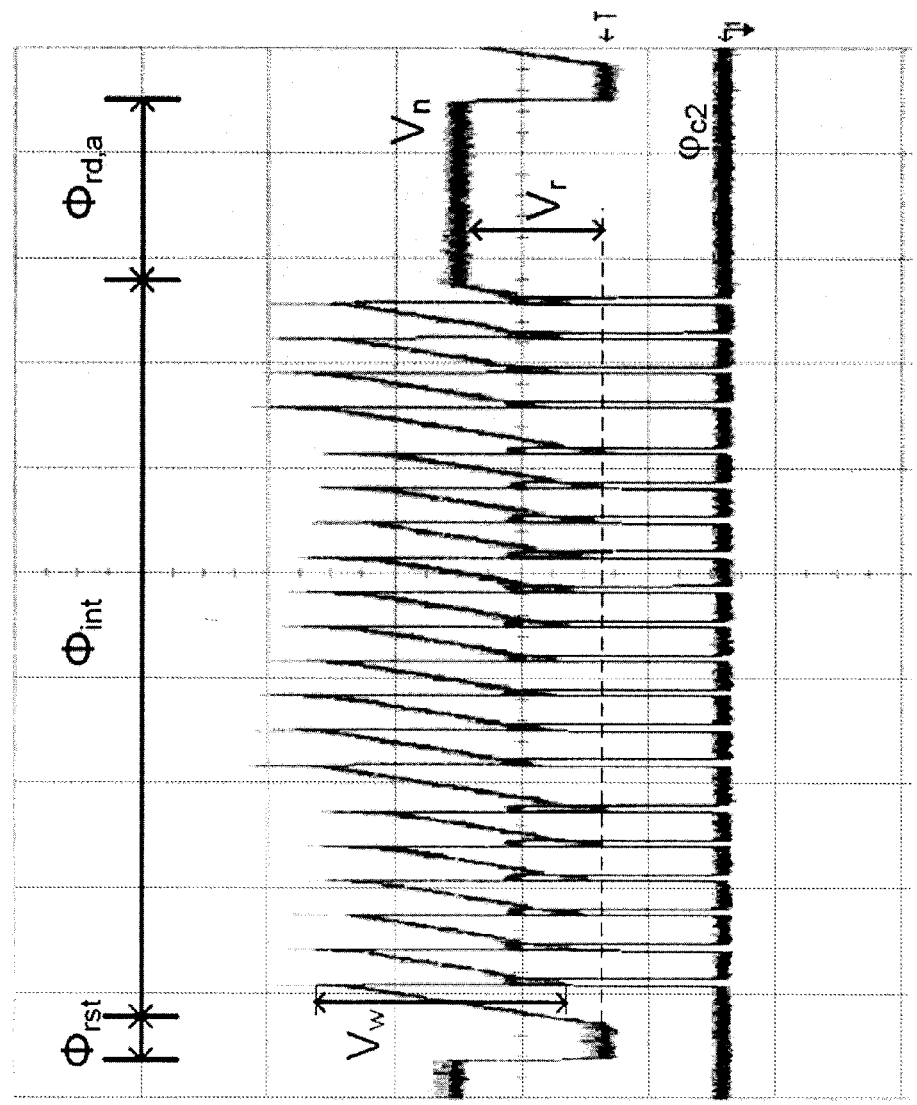
Figure 25:
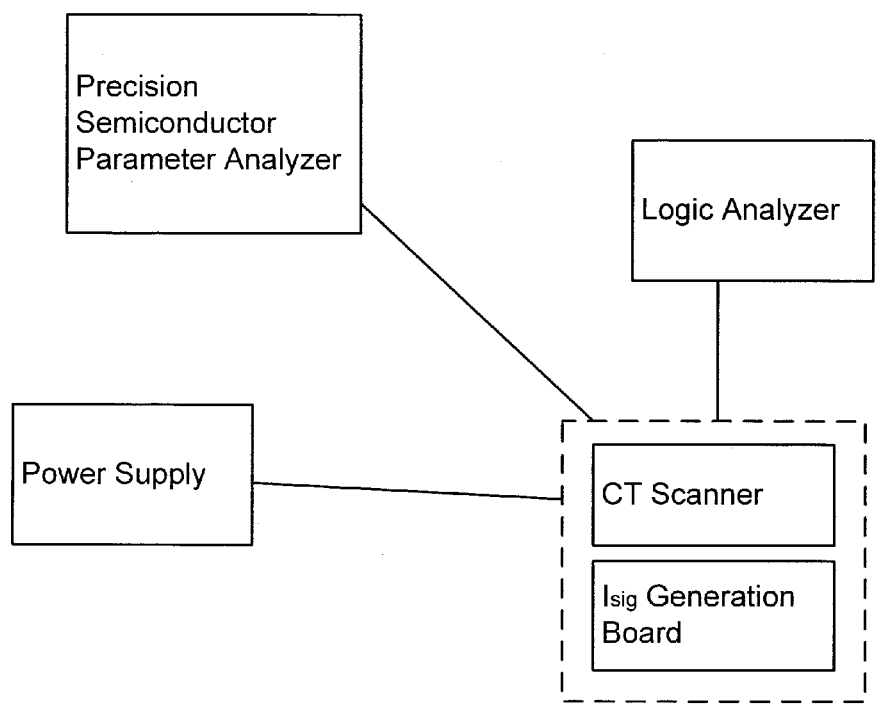
Figure 26:
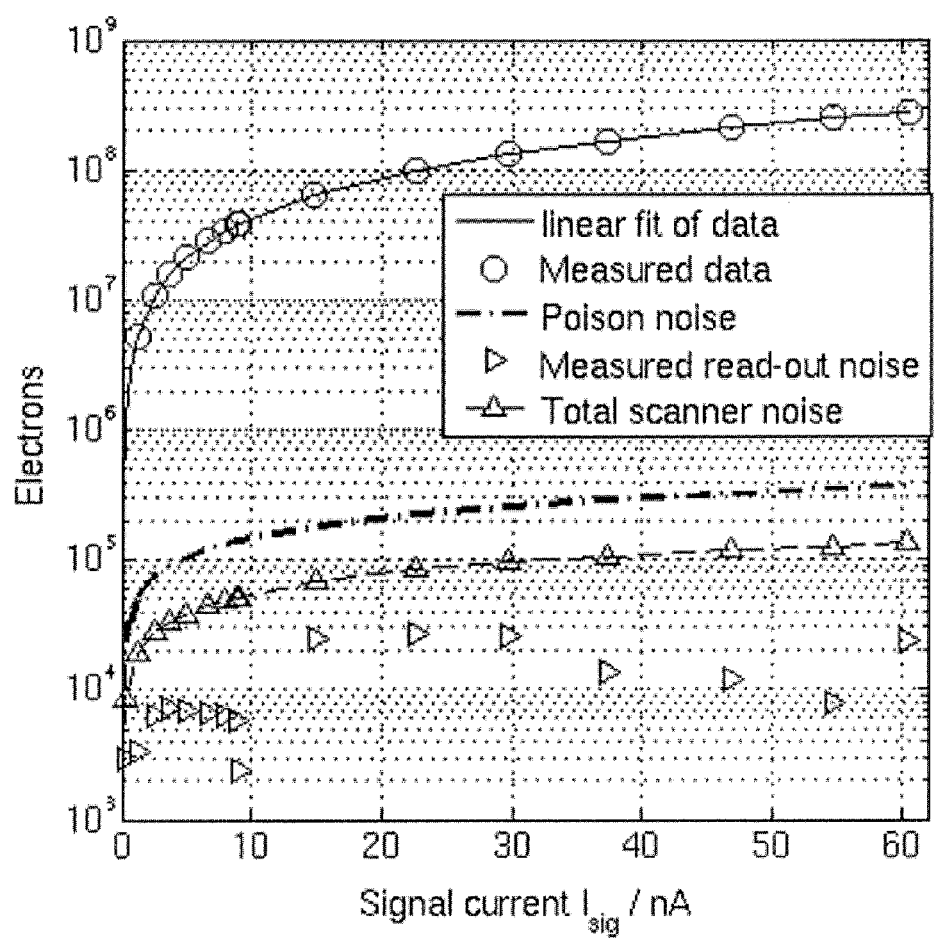
Figure 27:
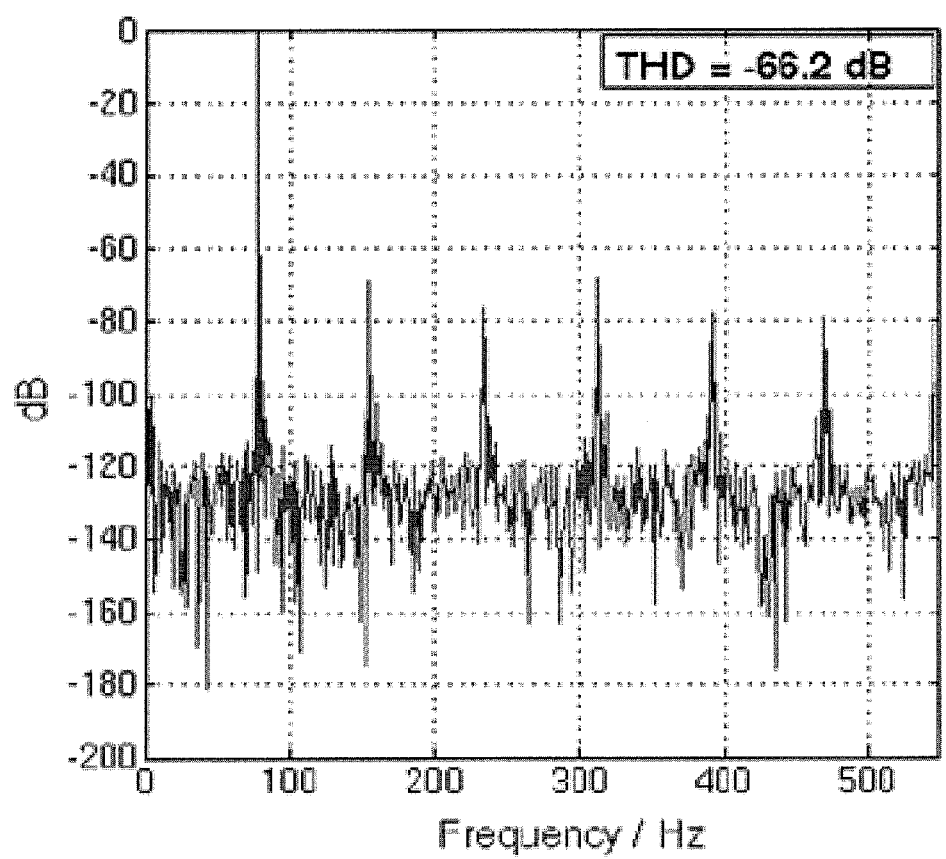

FIG. 12 includes graphs depicting simulation results of voltage fluctuation on a photodiode $V_{PD}$ over a range of photocurrent $I_{ph}$ for a simple cascode current front-end (top) in one embodiment and a cascode with gain-boosting current front-end (bottom) in another embodiment;

FIG. 13 is a circuit diagram showing the architecture of a level shifter in one embodiment;

FIG. 14 is a circuit diagram showing the architecture of a gain-boosted high swing OPAMP that may be used with embodiments of the present invention;

FIG. 15 includes graphs depicting HSPICE simulation results for $V_w$ noise and dependency of $V_w$ on $I_{ph}$ over a range of values for $I_{ph}$ in one embodiment;

FIG. 16 is a circuit diagram showing the architecture of a comparator and 1-bit memory in one embodiment;

FIG. 17 is a circuit diagram showing the architecture of a 1-bit memory of FIG. 16 in further detail in one embodiment;

FIG. 18 is a circuit diagram showing the architecture of a column-level ADC in one embodiment;

FIG. 19 is a timing diagram depicting the operation of $\phi_{az}$, $\phi_{cds,rst}$, $\phi_{cds,ramp}$ and $\phi_{clk,adc}$ in the column-level ADC of FIG. 18 relative to the reset, integration, and readout phases in one embodiment;

FIG. 20 is a simplified block diagram of a column circuit including a digital column bus and analog column bus in one embodiment;

FIG. 21 is a block diagram of a digital counter in one embodiment;

FIG. 22 is a timing diagram depicting the operation of control signals for the digital counter of FIG. 21 during $\Phi_{int}$ of one frame in one embodiment;

FIG. 23 is a micrograph of a prototype CMOS CT scanner with chip size 2 mm×2 mm according to one embodiment;

FIG. 24 is an oscilloscope screen depicting the outputs $V_n$ and $\phi_{c2}$ in an experiment involving the prototype depicted in FIG. 23;

FIG. 25 is a block diagram depicting the electrical performance measurement set-up used to evaluate the performance of the prototype depicted in FIG. 23;

FIG. 26 is a graph showing noise and linearity measurements corresponding to the prototype depicted in FIG. 23; and FIG. 27 is a graph showing an FFT analysis of measured data corresponding to the prototype depicted in FIG. 23.

DETAILED DESCRIPTION OF THE INVENTION

To better guide the reader, the detailed description of the invention is divided into multiple sections, organized according to the Table of Contents provided below:
I. General Environment
II. Principles of Synchronous Partial Quantization
III. Circuit Details
  A. Pixel Architecture
  B. Current Front-End
  C. Level Shifter
  D. OPAMP
  E. Comparator and 1-Bit Memory
  F. Column-Level ADC
  G. Column Circuit and Column Counter
IV. Prototype and Measurement Results
V. Conclusion and Closing Remarks

I. GENERAL ENVIRONMENT

Figure 1:
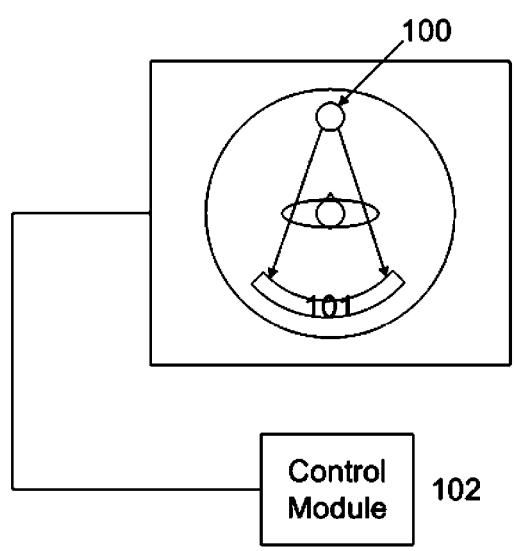
FIG. 1 is a simplified diagram depicting a conventional X-ray CT apparatus.
Figure 2:
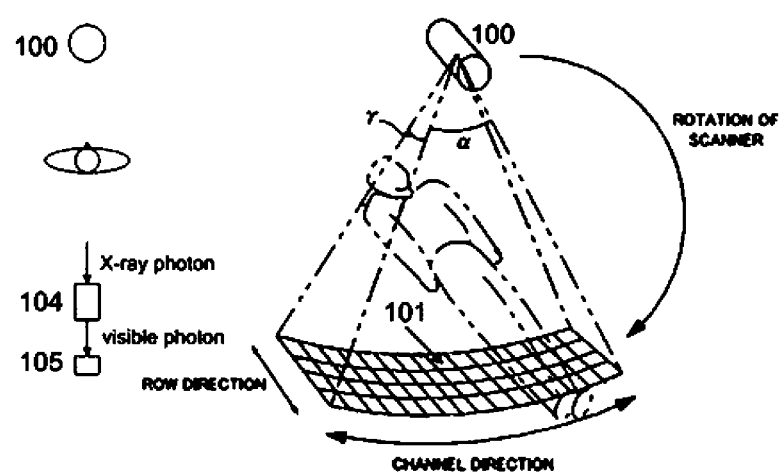
FIG. 2 is a simplified diagram depicting a conventional X-ray CT detector.
Figure 3A:
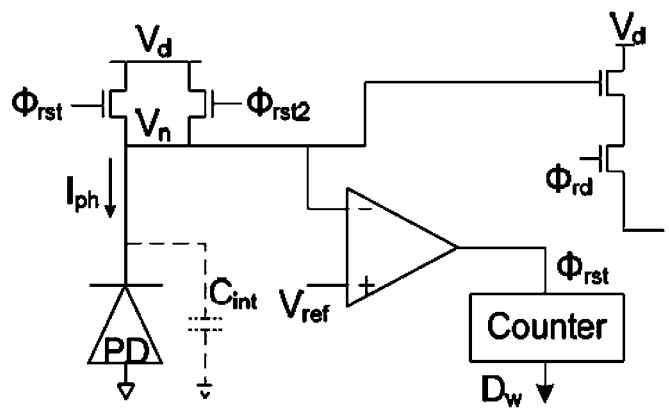
FIG. 3A is a circuit diagram depicting an active-pixel sensor in a conventional asynchronous partial quantization method.
Figure 3B:
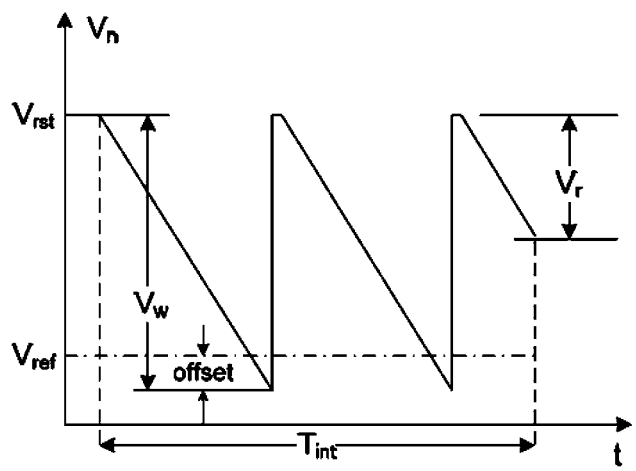
FIG. 3B is a graph of a voltage waveform depicting the behavior of $V_n$ in an active-pixel sensor in a conventional asynchronous partial quantization method.
Figure 4:
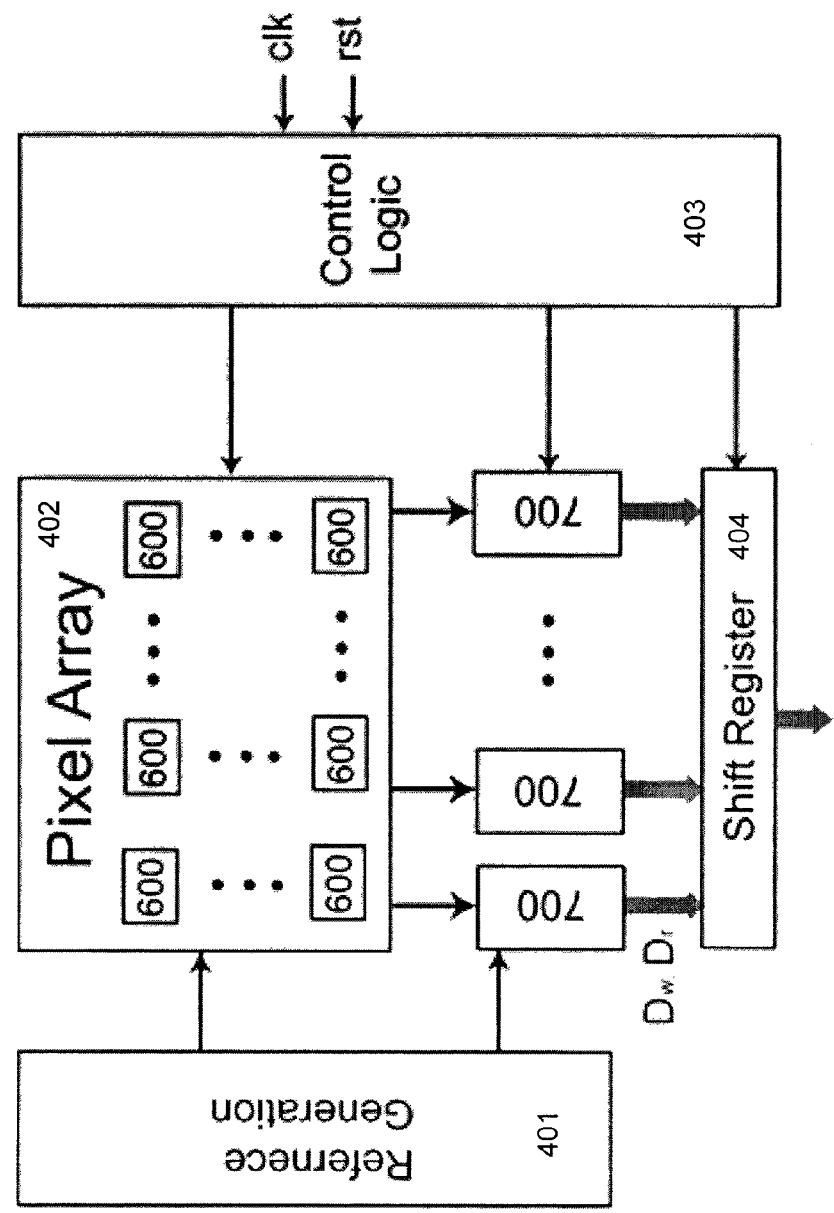
FIG. 4 is a block diagram depicting the architecture of an exemplary 2D CMOS detector environment.

An exemplary environment in which embodiments of the present invention may be implemented is depicted by FIG. 4. It will be appreciated that the depicted environment is an example, and does not imply any limitation regarding the use of other environments to practice the invention. FIG. 4 is a block diagram depicting the various components in a CMOS CT detector utilizing a 2D architecture, which includes a pixel array 402, an array of column processing circuits 700, a shift register 404, control logic 403 and reference generation circuits 401. Every pixel 600 of the pixel array 402 may be capable of performing synchronous partial quantization, as will be described in further detail below.

II. PRINCIPLES OF SYNCHRONOUS PARTIAL QUANTIZATION

Figure 5:
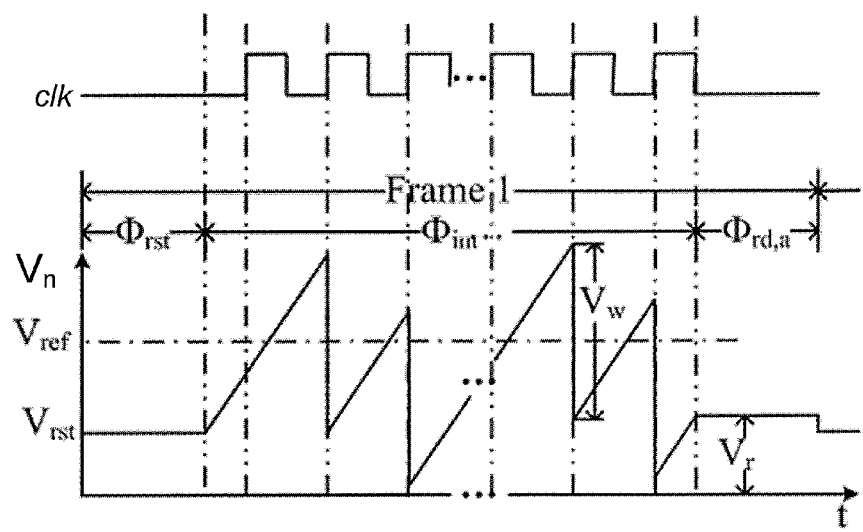
FIG. 5 is a graph of voltage waveforms depicting the behavior of $V_n$ relative to a clock signal clk in a synchronous partial quantization method.

The principle of the synchronous partial quantization scheme of the present invention is illustrated by the waveforms in FIG. 5, which depicts a clock waveform and a pixel voltage during one frame of operation. As seen in FIG. 5, the in-pixel quantization is synchronized to a system clock clk. The pixel operates in three clock phases: the reset phase ($\Phi_{rst}$), the integration phase ($\Phi_{int}$), and the analog readout phase ($\Phi_{rd,a}$). After the reset phase $\Phi_{rst}$, the pixel voltage $V_n$ is compared with a reference voltage $V_{ref}$ at every rising edge of clk. If the pixel voltage grows beyond $V_{ref}$, it will be subtracted with a constant potential well $V_w$ via non-overlapping clocks controlling a capacitor $C_s$ to transfer a constant amount of charge to $C_{int}$. The constant potential well $V_w$ is determined by the following equation:

$$V_w = \Delta Q/C_{int} = C_s/C_{int}(V_b - V_{cm}) \qquad (2)$$

where $\Delta Q$ is the transferred charge in each charge transfer phase. $V_b$ is the pre-charge voltage of $C_s$, and $V_{cm}$ is OPAMP reference voltage.

At the end of the integration phase $\Phi_{int}$, the residual pixel voltage $V_r$ is read out and quantized by a low-resolution ADC into $D_r$ during analog readout phase $\Phi_{rd,a}$. If the least significant bit size of the ADC is $LSB_0$, the overall integrated photovoltage is then $$V_{ph} = D_w \cdot V_w + D_r \cdot LSB_0 \qquad (3)$$

where $D_w$ is the number of pixel resets (i.e., the number of times $V_w$ was subtracted). Then, the accumulated voltage converts to the photocurrent by the relationship expressed in Eq. (1). Due to the synchronous charge transfer, the comparator delay will not cause $V_w$ variation. Comparator offset also has no effect on $V_w$ due to the switched-capacitor circuit. Even if the comparator makes an error due to the comparator offset and delay, the integrated photocharge is not affected. If the potential well size $V_w$ is kept constant during the in-pixel quantization, the linearity of the scheme can be high.

One implementation of synchronous partial quantization is discussed with further detail in Bing Liu and Jie Yuan, "A wide dynamic range high linearity in-pixel data acquisition front-end for computed tomography", in Proc. IEEE Int. Symp. Circuits Syst., Taipei, Taiwan, May 24-27, 2009, pp. 2301-2304 (hereinafter "Liu and Yuan"), which is incorporated herein by reference in its entirety.

III. CIRCUIT DETAILS

A. Pixel Architecture

Figure 6:
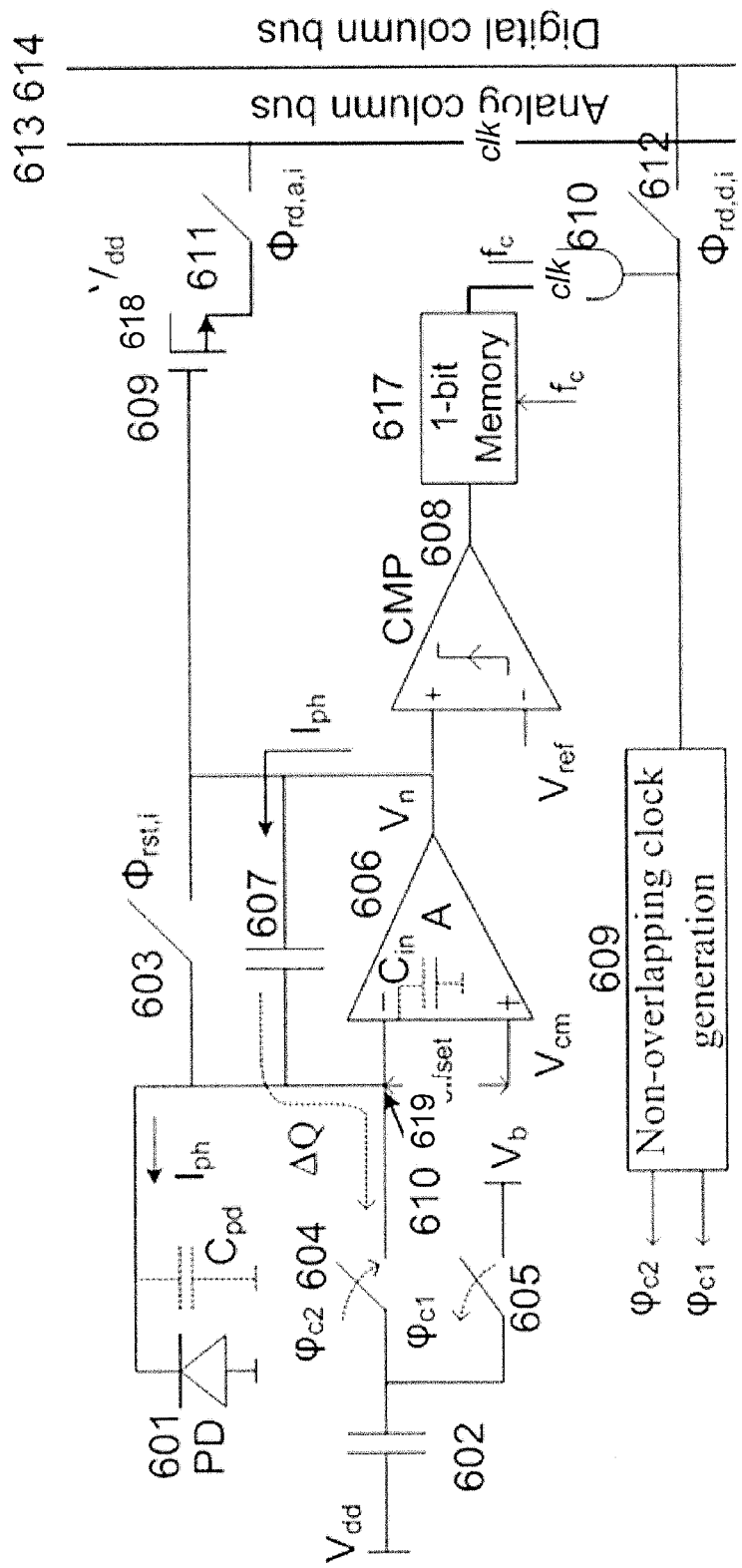
FIG. 6 is a circuit diagram depicting the components of a pixel in one embodiment.

Implementations of synchronous partial quantization may be better understood in the context of the corresponding circuit. FIG. 6 illustrates the block diagram of a synchronous partial quantization pixel i in one embodiment. After the reset phase ($\Phi_{rst,i}$), the reset switch 603 opens. The photocurrent $I_{ph}$ discharges the integration capacitor $C_{int}$ 607, and increases the photovoltage $V_n$. The comparator 608 compares $V_n$ and the reference voltage ($V_{ref}$). The output of the comparator is recorded by a 1-bit memory 617 synchronously to the system clock (clk). Gated by the system clock with an AND gate 610, the memory 617 controls the non-overlapping clock generation module 609 to generate non-overlapping clocks ($\phi_{c1}$, $\phi_{c2}$). If $V_n$ increases beyond $V_{ref}$, the non-overlapping clocks ($\phi_{c1}$, $\phi_{c2}$) control switches 605 and 604 so that the sampling capacitor ($C_s$) 602 transfers a constant amount of charge ($V_w$) to the integration capacitor ($C_{int}$) 607.

Hence $V_n$ is reduced by a constant potential well $V_w$. At the end of the integration phase ($\Phi_{int}$), the residual voltage $V_r$ will be read out through the analog column bus 613 and quantized by a low-resolution ADC into $D_r$ during the analog read-out phase ($\Phi_{rd,a,i}$). The output of the AND gate 610 will be periodically read out through the digital column bus 614 (see "G. Column Circuit and Column Counter" below for more details regarding digital readout). The 1-bit memory is reset after every digital readout. Due to the synchronous charge transfer, delay of comparator 608 will not cause $V_w$ variation. Offset of comparator 608 also has no effect on $V_w$ due to the switched-capacitor circuit formed by 602, 604, 605, 607 and 606. Even if the comparator makes an error due to the comparator offset and delay, the integrated photocharge is not affected. However, in this embodiment, the large capacitance of the photodiode (PD) 601 loads directly at the integration node 619, which increases the nonlinearity and noise of the pixel. Also, the signal-dependent offset variation of the OPAMP 606 causes variation in the potential well size $V_w$.

The uniformity of potential well $V_w$ is limited by the offset variation of the OPAMP, which is mainly dependent on $I_{ph}$ current sourcing ($V_{offset,I}$), output voltage ($V_{offset,V}$) and mismatch ($V_{offset,m}$) as shown in Eq. (4):

$$V_{offset} = V_{offset,I} + V_{offset,V} + V_{offset,m} = I_{ph}/g_m + V_n/A + V_{offset,m} \quad (4)$$

where $g_m$ is the OPAMP transconductance and A is the OPAMP open loop gain. The capacitance at the integration node will cause extra charge loss from $C_{int}$ if the offset varies.

Figure 7:
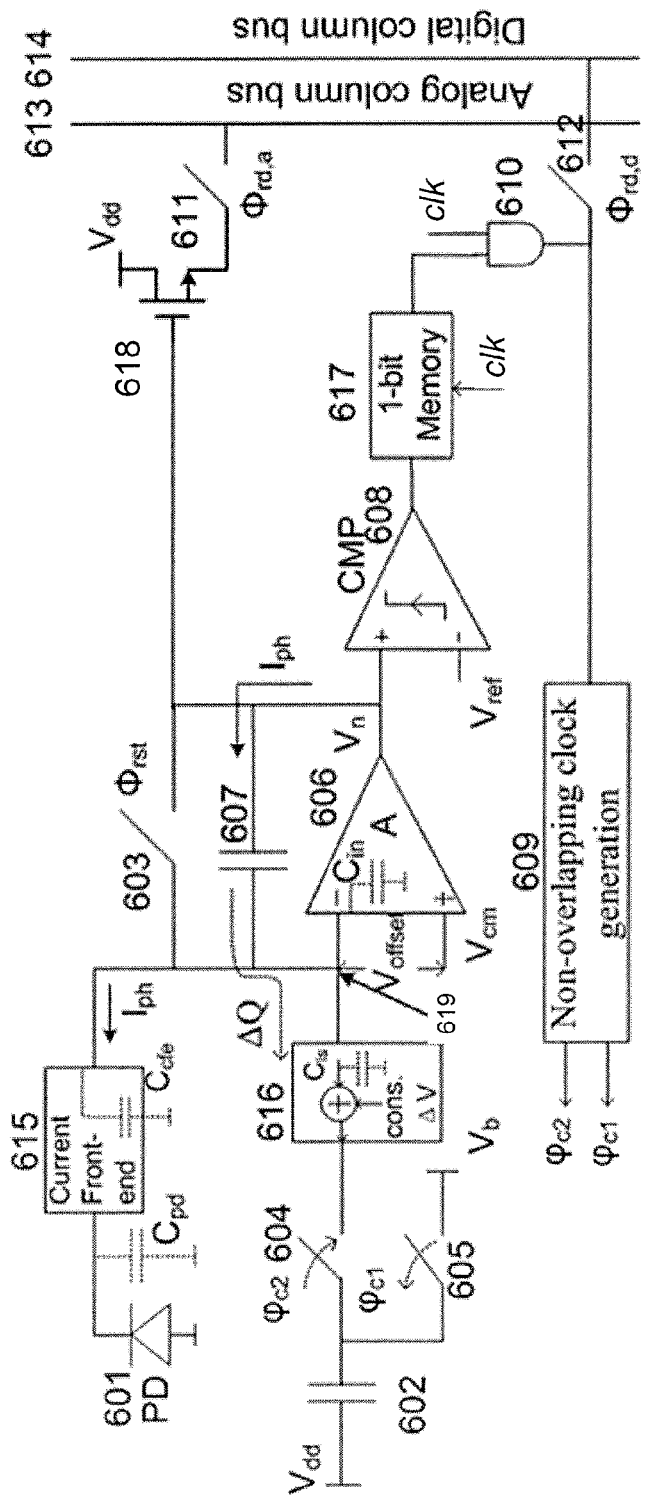
FIG. 7 is a circuit diagram depicting the components of a pixel in another embodiment.

In a further embodiment depicted by FIG. 7, an improved synchronous partial quantization pixel may include a current front-end 615 to decouple the photodiode 601 from the integration node 619, and a level shifter 616 to track the offset variation of the OPAMP 606. The general principles of operation with respect to FIG. 7 are similar as described above with respect to FIG. 6. However, the addition of the current front-end 615 and the level shifter 616 allow greater uniformity to be achieved with respect to the potential well $V_w$, resulting in better linearity of the synchronous partial quantizer pixel.

Figure 8:
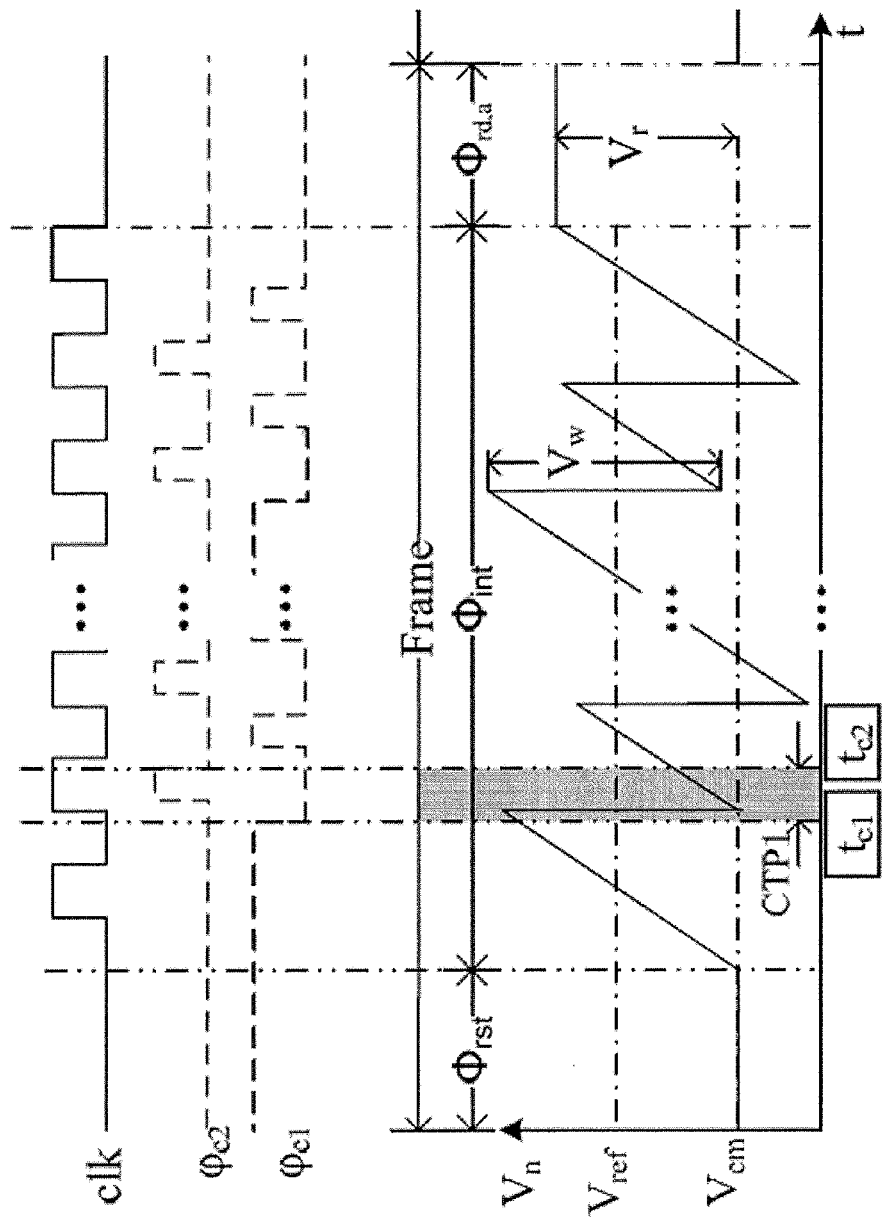
FIG. 8 is a graph of voltage waveforms depicting the behavior of $V_n$ relative to a clock signal clk and non-overlapping clock signals ($\phi_{c1}$, $\phi_{c2}$) in a synchronous partial quantization method.

Considering the charge transfer phase CTP 1 in FIG. 8, which depicts waveforms of photovoltage $V_n$ relative to the clock signal clk and non-overlapping clock signals ($\phi_{c1}$, $\phi_{c2}$), the transferred charge on $C_s$ is:

$$\begin{aligned}\Delta Q_s &= C_s \cdot [(\Delta V + V_{i-,c1}) - V_{i-,c2}] \quad (5) \\ &= C_s \cdot \begin{bmatrix} (\Delta V + V_{cm} + I_{ph}/g_m + V_{n,c1}/A) - \\ (V_{cm} + I_{ph}/g_m + V_{n,c2}/A) \end{bmatrix} \\ &= C_s \cdot [\Delta V + (V_{n,c1} - V_{n,c2})/A].\end{aligned}$$

where $\Delta V$ is a constant voltage generated by the level shifter, and $V_{i-,c1}$ and $V_{i-,c2}$ are integration node voltages at time $t_{c1}$ and $t_{c2}$ respectively, and $t_{c1}$ and $t_{c2}$ are the moments when switch $\phi_{c1}$ turns off and switch $\phi_{c2}$ turns off, as shown in FIG. 8. $V_{n,c1}$ and $V_{n,c2}$ are OPAMP output voltages at time $t_{c1}$ and $t_{c2}$. $I_{ph}$ is a low frequency signal comparing with the partial quantization clock (clk). Therefore, voltage offset ($I_{ph}/g_m$) is cancelled in Eq. (5), which is essentially a correlated double sampling (CDS). This CDS operation can also cancel the OPAMP 1/f noise.

Similarly, the charge change of the capacitors at the integration node, which includes the parasitic output capacitance of the current front-end ($C_{cfe}$), voltage level shifter input capacitance ($C_{ls}$) and the OPAMP input capacitance ($C_{opa}$), is:

$$\Delta Q_{opa} + \Delta Q_{cfe} + \Delta Q_{ls} = (C_{opa} + C_{cfe} + C_{ls}) \cdot (V_{n,c1} - V_{n,c2})/A \quad (6)$$

The charge change ($\Delta Q_{int}$) on $C_{int}$ can be calculated by the voltage variations both at node $V_n$ and $V_{i-}$. Since the voltage variation at $V_n$ is the potential well $V_w$, then:

$$\Delta Q_{int} = C_{int} \cdot (V_{i-,c1} - V_{i-,c2} - V_w) = C_{int} \cdot [-V_w + (V_{n,c1} - V_{n,c2})/A] \quad (7)$$

Because the sum of the charge changes in Eqs. (5)-(7) is zero, the potential well $V_w$ is given by the following equation:

$$V_w = C_s/C_{int} \cdot \Delta V + (C_s + C_{opa} + C_{cfe} + C_{ls} + C_{int})/C_{int} \cdot (V_{n,c1} - V_{n,c2})/A \quad (8)$$

As can be seen from Eq. (8), the uniformity of the potential well is limited by the second term, and thus the OPAMP should be designed with a high gain to minimize the variation. Eq. (8) also shows that the addition of the current front-end and the level shifter in FIG. 7 greatly improve the uniformity of $V_w$.

Figure 9:
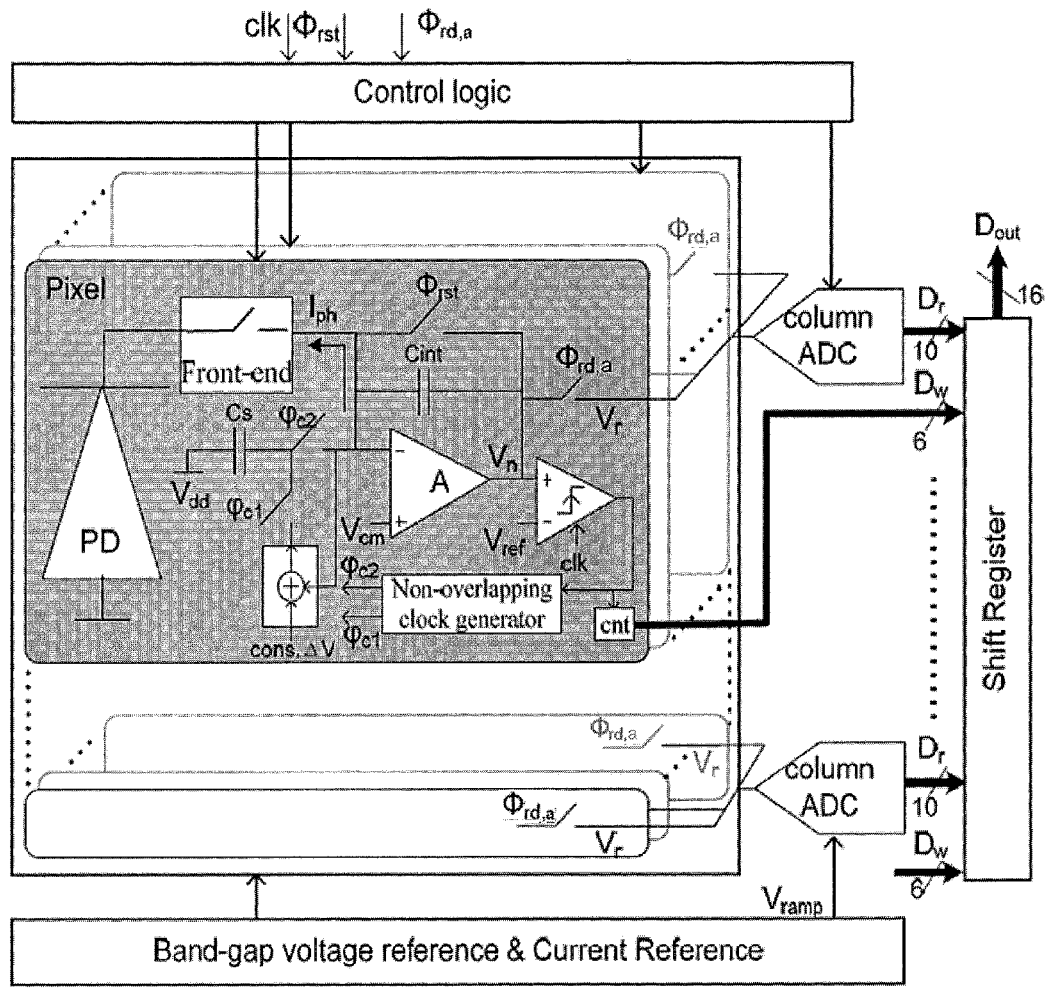
FIG. 9 is a diagram depicting pixel architecture in one embodiment within the context of the general 2D CMOS detector environment of FIG. 4.

Implementation of one embodiment of a pixel for synchronous partial quantization comprising a current front-end and level-shifter within the context of the general environment of FIG. 4 is depicted by the block diagram of FIG. 9. In the reset phase ($\Phi_{rst}$), integration capacitor $C_{int}$ is reset. During the integration phase ($\Phi_{int}$), the pixel circuit integrates the photocurrent $I_{ph}$ to $V_n$ which is partially quantized to $D_w$. At every rising edge of clk, the comparator checks $V_n$ for an overflow. If an overflow is detected, the switched-capacitor element will absorb the charge to reduce $V_w$ from $V_n$ as described with respect to FIGS. 5 and 8. At the end of the integration phase ($\Phi_{int}$), the residual voltage ($V_r$) is sampled on $C_{int}$ by switching off $I_{ph}$ in the current front-end. In the analog readout phase ($\Phi_{rd,a}$), $V_r$ is selectively read out and quantized by a column level ADC to $D_r$. $D_w$ and $D_r$ are sent off chip by a shift register to calculate the photocurrent by Eq. (1).

Figure 10:
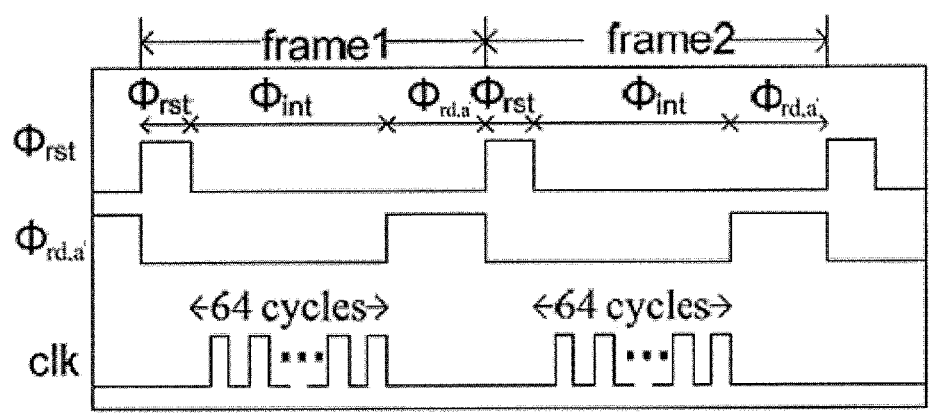
FIG. 10 is a timing diagram depicting the clk, $\Phi_{rst}$ and $\Phi_{rd,a}$ signals during two frames in one embodiment where 64 clk cycles are assigned in an integration phase ($\Phi$int)

If 64 clk cycles are assigned in a integration phase ($\Phi$int), the dynamic range of the CT scanner is expanded by 6 bits. With 10 bits column ADCs, the CT scanner will have 16 bits dynamic range. The timing diagram of the scanner is shown in FIG. 10. Design specifications of the scanner in one exemplary embodiment are listed in Table I below.

TABLE I

| CMOS CT Scanner Design Specifications | |
|---|---|
| Minimum signal | 6 pA |
| Maximum signal | 63.4 nA |
| Noise level | 0.8 $pA_{rms}$ |
| Dynamic Range | 16.3 bits |
| Integration capacitor $C_{int}$ | 840 fF |
| Subtraction capacitor $C_s$ | 200 fF |
| Frame time | 913 µs |
| Partial quantization clock | 90.9 kHz |
| In-pixel reset | 33 µs |
| In-pixel integration | 704 µs |
| In-pixel readout | 176 µs |
| Linearity in relative deviation | <0.06% |
| Geometrical detective quantum efficiency (GDQE) | 75.5% (with voltage reference and ADC) |

In this exemplary embodiment, physically, the photodiode occupies a majority of the area in a pixel of the CT scanner. The photodiode used in the embodiment may be an N-well P-sub photodiode (PD) with dotted-structure, such as the one developed in R. Steadman et al., "A CMOS photodiode array with in-pixel data acquisition system for computed tomography," *IEEE J. Solid-State Circuits*, vol. 39, no. 7, pp. 1034-43, July 2004, which is incorporated herein by reference in its entirety. The diode is implemented in a 0.35 µm CMOS process with the size of 1.390 mm×0.830 mm. The N-well dot is 10 µm×10 µm. The distance between each dot is 100 µm, which is twice the electron diffusion length in the process. The total capacitance is 5.6 pF~6.4 pF. With parallel dots, the diode capacitance is 8-9 times smaller than the large area N-well diode. Electrons generated outside the depletion region are collected by the N-well dots due to the diffusion of minority carriers. A p+ doping region on the surface builds up the potential barrier for minority carriers to recombine at the surface. As a result, the responsivity is improved.

B. Current Front-End

Figure 11:
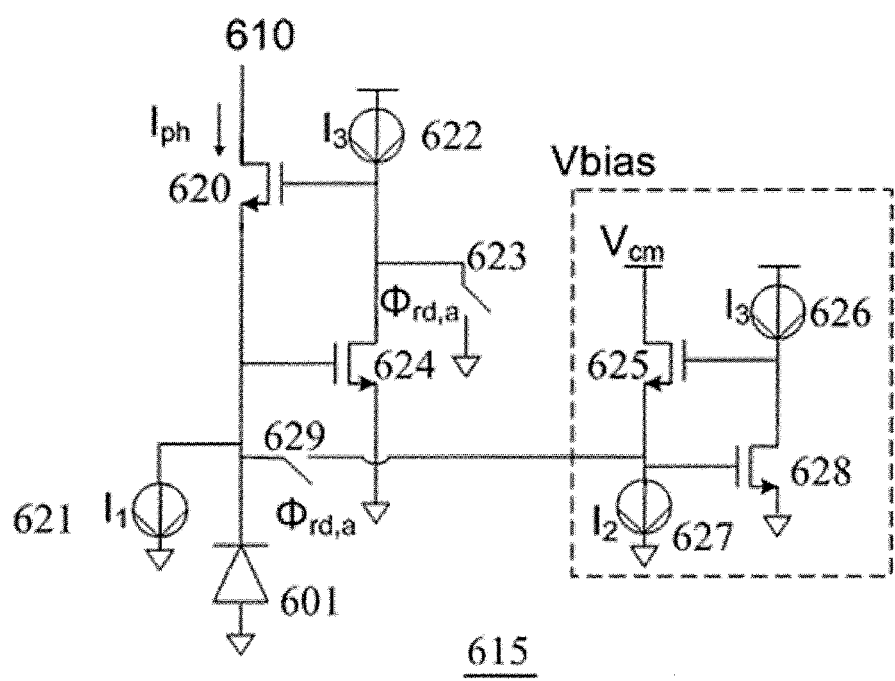
FIG. 11 is a circuit diagram showing the architecture of a current front-end utilizing a gain-boosted cascode transistor in one embodiment.

An exemplary embodiment of the current front-end is depicted by the circuit diagram of FIG. 11. In this current front-end, a gain-boosted cascode transistor, which is formed by NMOS transistors 620, 624 and current source 622, decouples the photodiode 601 from the integration node 619. Transistor 620 is gain-boosted by transistor 624, the photodiode biasing branch (Vbias), and the two $\Phi_{rd,a}$ switches 623 and 629. During the analog read-out phase ($\Phi_{rd,a}$), the cascode transistor 620 is turned off by switch 623 (and thus $I_{ph}$ is turned off). An identical branch formed by NMOS transistors 625, 628, and current sources 626, 627 are used to bias the photodiode 601 during the analog read-out phase ($\Phi_{rd,a}$). As shown in the timing diagram in FIG. 10, $\Phi_{rd,a}$ switches 623 and 629 turn off before the reset phase $\Phi_{rst}$. Thus, the charge injection from the $\Phi_{rd,a}$ switches 623 and 629 will not be accumulated on $C_{int}$. A very small current source 621 can be used to expedite the settling of the pixel during the reset phase ($\Phi_{rst}$).

The gain-boost transistor 624 greatly reduces the voltage fluctuation on the photodiode, and reduction of phodiode voltage fluctuation increases the linearity of the current front-end (since photodiode voltage fluctuation causes photocharge to remain in the diode potential well). The simulation results for an embodiment utilizing a simple cascode (top) and an embodiment utilizing a gain-boosted cascode (bottom) are depicted by the two graphs in FIG. 12. The simulation results (see Table II below) showed that the gain-boosted cascode (bottom) reduces the photodiode variation ($V_{PD}/V$) from 330 mV to 2.2 mV. With the gain-boosting transistor 624, the front-end outputs $I_{ph}$ with −106.7 dB THD. The output capacitance $C_{cfe}$ is 112 aF. 500 pA biasing current is injected into transistor 620 to expand the bandwidth at a low $I_{ph}$ level to be larger than 46.9 kHz.

Table II below compares the performance of the embodiments of a current front-end with a simple cascode and with a gain-boosted cascode.

TABLE II

Performance of Current Front-Ends

| | Simple | With Gain-Boosting |
|---|---|---|
| Signal Range | 6 pA–128 nA | 6 pA–128 nA |
| Vdiode variation | 330 mV | 2.2 mV |
| Charge variation | 264 × 10⁹ e⁻ | 1.76 × 10⁹ e⁻ |
| Bandwidth | 600 Hz | 46.9k Hz |
| Power | — | 16.1 uA |

C. Level Shifter

In one embodiment of the level shifter depicted by FIG. 13, PMOS transistors 630, 631, 632, 634, 635, 636 and current sources 633, 637 form a loop to generate a constant voltage level shift from the voltage at the integration node 619. The shifted voltage is used to charge the sampling capacitor 602 so that the potential well remains constant even if the OPAMP 606 offset varies.

The constant voltage level shifter is implemented by the gate-source voltage $V_{gs}$ of two PMOS transistors 634 and 635. The drain-source voltage $V_{ds}$ of transistors 634 and 635 are clamped by a loop with four PMOS diodes 636, 630, 631, and 632. Channel length modulation of transistors 634 and 635 is minimized due to the constant $V_{ds}$. Thus, the voltage offset $\Delta V$ is generally constant and generates a $V_w$ with low variation. The gate capacitance of transistor 635 ($C_{ls}$) is minimized to reduce the loading at the integration node 619 ($V_{i-}$). In one exemplary embodiment, the power consumption of the voltage level shifter is 35 μW, which is dominated by the slewing of $C_s$ in $\phi_{c1}$ phases, and the 3-dB bandwidth ($BW_{-3\,dB}$) is 5 MHz.

D. OPAMP

As mentioned above, the OPAMP 606 should be designed with a high gain to minimize the variation of $V_w$, and thus it is preferable for the OPAMP 606 to utilize gain-boosted architecture to reduce the output-voltage-dependent offset. For example, the OPAMP architecture described in Liu and Yuan, depicted in FIG. 14, may be used.

In one exemplary embodiment, a gain-boosted folded-cascode is designed for a larger than 90 dB gain. The OPAMP uses 5V transistors to achieve the high swing of $2V_w$. The swing range is defined as the output voltage range with more than 90 dB OPAMP gain. The gain bandwidth product (GBW) of the OPAMP is 6.6 MHz. The input capacitance is minimized to 26.5 fF. With a 0.85 V potential well Vw, the designed swing of the OPAMP is 0.84 V to 3.14 V. The power consumption is 39 uW.

The performance of the OPAMP in this exemplary embodiment is summarized in Table III below.

TABLE III

OPAMP Performance

| | |
|---|---|
| GBW | 6.6 MHz |
| Gain | 90 dB |
| Phase Margin | 86.4 degree |
| Input Capacitance | 26.5 fF |
| Output Voltage Swing | 0.84 V to 3.14 V |
| Load | 1.2 pF |
| Consumption | 39 μW |

In an embodiment of the present invention utilizing this OPAMP together with the voltage level shifter depicted by FIG. 13 and the current front-end depicted by FIG. 11, HSPICE simulation showed that the synchronous partial quantizer pixel could achieve a $V_w$ noise of less than $30\,\mu V_{rms}$ in the photocurrent range of 6 pA to 65 nA. The results of this simulation are shown in top graph of FIG. 15, and a simulation of the dependency of $V_w$ on $I_{ph}$ is plotted in the bottom graph of FIG. 15. As can be seen from FIG. 15, $V_w$ fluctuates as little as 30 μV over the entire $I_{ph}$ range.

E. Comparator and 1-Bit Memory

Synchronous comparison within the pixel architecture of FIGS. 6 and 7 is realized by a comparator 608 and a 1-bit memory 617. The comparator 608 may be a simple comparator utilizing differential pair architecture, as depicted in the circuit diagram of the comparator and 1-bit memory in FIG. 16. The output of the comparator and dynamic random-access-memory (DRAM) is synchronously sampled on the capacitor $C_B$. As shown in FIGS. 6 and 7, the output is used to gate the chip clock clk to generate the partial quantization phase clock $\phi_{c1}$ and $\phi_{c2}$. An extra current mirror branch is inserted between the input and the output stage of the comparator as shown in FIG. 16 to reduce the kick back on $V_n$ node, which is a highly sensitive node. This configuration was carefully designed to separate digital noise from analog components.

FIG. 17 is a circuit diagram depicting the 1-bit memory of FIG. 16 in further detail. The data is stored on capacitor 641. Transistor 640 enables writing of the comparator output into the DRAM synchronously with the clk signal. Switch 642 controls the reset of the DRAM by signal $\Phi_{d,rst,i}$. Transistor 640 is designed with strong write capability while the reset switch 642 is designed with weak reset capability, such that a new value may be written into the DRAM during the reset period (i.e., when both 640 and 642 are turned on).

F. Column-Level ADC

A column-level residual ADC in one embodiment is depicted by FIG. 18. The ADC is a 10 bit single-slope ADC. The simple structure of this low resolution ADC makes it suitable for column-level processing. As depicted by FIG. 18, auto-zero is used to remove the ADC preamp offset, and double sampling is used on $V_n$ to remove the OPAMP offset in the partial quantizer. At the beginning of each frame, both auto-zero switches $\phi_{az}$ and CDS switch $\phi_{cds,rst}$ turn on. Auto-zero switches $\phi_{az}$ turn off first to sample the ADC preamp offset on $C_{az1}$ and $C_{az2}$. At the end of the reset phase, $\phi_{cds,rst}$ switches off to sample the partial quantizer reset voltage $(V_{n,rst})$ on $C_r$. In the analog readout phase $(\Phi_{rd,a})$, $V_n$ becomes the residual voltage $V_r$ which is applied to $C_s$. The $\phi_{cds,ramp}$ switch turns on to apply the ramp signal $V_{ramp}$ to $C_r$. The counter latches the number of $\phi_{clk,adc}$ clock cycles until $V_{ramp}$ reaches the difference between $V_r$ and $V_{n,rst}$. The operation of $\phi_{az}$, $\phi_{cds,rst}$, $\phi_{cds,ramp}$ and $\phi_{clk,adc}$ is shown relative to the reset, integration, and readout phases in the timing diagram of FIG. 19. This double CDS scheme in the column-level ADC and the partial quantizer can effectively remove the OPAMP offset and 1/f noise, which helps to achieve high linearity for the synchronous partial quantization scheme.

It will be appreciated that other different structures may be utilized to design the ADC. For example, in another embodiment, the single-slope ADC design described in M. Snoeij et al., "A CMOS imager with column-level ADC using dynamic column fixed-pattern noise reduction", *IEEE Journal of Solid-State Circuits*, Vol. 41, pp. 3007-3015, December 2006, which is incorporated herein by reference in its entirety, may be used.

G. Column Circuit and Column Counter

FIG. 20 depicts a simple block diagram of column circuit 700 in one embodiment (see FIGS. 4, 6 and 7 for context). The single-bit data from the various rows on the digital column bus 614 is periodically processed by column counter 701 during the integration phase. During the analog readout phase, analog buffer 618 (see FIGS. 6-7) in each pixel is driven by a column current source 702. The output analog value on the analog column bus 613 is quantized by an n-bit ADC 703 into digital code $D_r$. The resolution of the ADC is generally 8-10 bits (e.g., the ADC in one embodiment described above has a resolution of 10 bits).

The block diagram of counter 701 for a j-th column in one embodiment is shown in FIG. 21. An exemplary timing diagram corresponding to the control signals for the counter 701 is shown in FIG. 22. The counter 701 includes an array of static random-access-memory (SRAM). Each SRAM is m bits long and holds the self-reset number $(D_w)$ of the pixel from one row. SRAMs of different rows are opened sequentially by control signal $\phi_{sram,i}$. The operation sequence on every SRAM includes a read and a write, which is performed in a counter clock $\phi_{clk,cnt}$ cycle. In the read phase of SRAM (i,j), the $\Phi_{rd,d}$ switch 612 of pixel (i,j) is turned on and connects AND gate 610 to the digital column bus 614 so that the content of the 1-bit memory 617 is added to the SRAM by adder 711, which provides a new $D_w$ for pixel (i,j). On the $\phi_{clk,cnt}$ falling edge, the new $D_w$ is latched by register 712. As control signal $\phi_{cwr}$ turns on transistors 716 and 719, the new $D_w$ is written into the SRAM (i,j). During the write phase of the same SRAM, the 1-bit memory 617 in pixel (i,j) is also reset by signal $\phi_{d,rst,i}$. The BIT bus and the BIT* bus are equalized by control signal $\phi_{eqw}$ before any SRAM cell is opened. SRAM cells are reset by the control signal $\phi_{reg,rst}$. During each frame, an m-bit long SRAM needs to be refreshed by $2^m$ times. As a result, the dynamic range of the image sensor is expanded by $2^m$ times with this partial quantization method. The dynamic range of this partial quantization architecture is m+n bits. The frequency of the counter clock is $2^m \times N_r \times f_{frame}$, where $N_r$ is the number of rows.

IV. PROTOTYPE AND MEASUREMENT RESULTS

A prototype of one embodiment of the synchronous partial quantization CMOS CT scanner with a single pixel as described herein was fabricated utilizing a 0.35 μm CMOS process. A micrograph of the die of the prototype with component regions labeled is depicted in FIG. 23. The active die area is 2 mm×1.4 mm, which includes a photodiode, a synchronous partial quantizer, a single-slope ADC, a shift register and a band-gap voltage reference. The partial quantizer and the ADC cover 0.227 mm×0.169 mm. The geometrical detective quantum efficiency (GDQE) of the prototype chip including the voltage-reference and the ADC is 75.5%. For the synchronous partial quantizer pixel depicted by FIG. 7, the GDQE is as large as 96.8%.

With light illuminating on the photodiode, the synchronous partial quantization operation can be observed at the output of the synchronous partial quantizer $(V_n)$ as plotted in the waveform graph of FIG. 24. In this experiment, the light was generated by a light source, Fiber-Lite PL900 (Dolan Jenner Industries), with an integrating sphere, US-120-SF (Labsphere, Inc.). The potential well $V_w$ is labeled on the waveform. The frame duration was 913 μs with a 33 μs reset phase, a 704 μs integration phase, and a 176 μs analog readout phase. The chip clock cycle for synchronous partial quantization was 11 μs. A detailed characterization of the optical performance of the photodiode used in the prototype may be found in L. Spies et al., "Performance of prototype modules of a novel multislice CT detector based on CMOS photosensors," *Progress in Biomedical Optics and Imaging, Proc. SPIE Medical Imaging Conf.* 2003, vol. 5030, San Diego, Calif., pp. 490-503, February 2003 (hereinafter "L. Spies et al."), which is incorporated herein by reference in its entirety.

In order to measure the high linearity and noise of the synchronous partial quantization circuits, an experimental electrical set-up including a precision semiconductor parameter analyzer, a power supply, a logic analyzer, an $I_{sig}$ generation board, and the prototype CT scanner was used, as depicted by FIG. 25. A highly accurate current $(I_{sig})$ was injected into the current front-end of the prototype CT scanner. The photocurrent was disabled during the testing by masking the photodiode to black it out, but the diode capacitance of the photodiode still loaded the quantizer. The signal current $I_{sig}$ was generated by a circuit board with a high resolution digital-to-analog converter (DAC) and a voltage to current converter (the $I_{sig}$ generation board). Verified by the Precision Semiconductor Parameter Analyzer (PSPA, HP 4156A), $I_{sig}$ had 16-bit resolution with a current range from 0.3 pA to 117 nA. $I_{sig}$ was quantized by the CT scanner into outputs $(D_w, D_r)$, and the outputs (a.k.a. digital codes) were captured by a logic analyzer (Agilent 16702B).

FIG. 26 is a graph depicting the results of the noise and linearity measurements of the prototype CMOS CT scanner. The digital codes from the prototype chip are converted into the unit of electrons. The circle markers are the measured signal without averaging. The solid line is the linear fit of the measured data with least mean square error. The dashed line is the Poisson noise level. The triangle markers are the measured read-out noise. The dashed line with triangle markers shows the total scanner noise with measured read-out noise and calculated photodiode noise.

The relative deviation ranges from 0.002% to 0.06% between the measured data and its linear fit. For CT applications, the relative deviation is proportional to image artifacts after the image reconstruction, as described by L. Spies et al. With a relative deviation that is smaller than 0.1%, there will be no artifacts after the image reconstruction. 1 k-pt Fast Fourier Transform (FFT) analysis was also performed on the measured data, and the result is plotted in the graph of FIG. 27. As shown in FIG. 27, the prototype CT scanner was able to achieve −66.2 dB THD without calibration. The current processing range of the prototype CT scanner was from 6 pA to 63.4 nA.

For a quantum limited CT scanner, the electronic noise should be smaller than the X-ray Poisson noise. As shown in FIG. 26, the Poisson noise increases with the light intensity. The minimum quantum limited noise for the prototype scanner is 0.8 $pA_{rms}$, which corresponds to 4565 $e^-$ for the 913 µs frame period. As no photocurrent flows into the scanner during the testing, the measured electronic noise is only the read-out circuit noise, which is plotted with triangle markers in FIG. 26. The read-out noise decreases with the signal current level, and the minimum measured read-out noise was 2900 $e^-$. The photodiode shot noise is calculated and added to the read-out noise to estimate the overall noise of the CT scanner. FIG. 26 shows that the total scanner noise is smaller less than the Poisson noise over the whole range of signal current. With a minimum signal current of 6 pA, the total scanner noise is 3183 $e^-$, which corresponds to 0.6 $pA_{rms}$. Therefore, the dynamic range of the CT scanner is 16.7 bits.

The properties and performance of the prototype of the monolithic CMOS CT scanner described herein was compared with previous CMOS CT scanners in Table IV below. At that time, this invention was the only known monolithic CMOS CT scanner. It achieved better linearity of 0.002% to 0.06%, which is essentially artifact-free. However, the noise level of this work was slightly higher than the voltage-mode CT scanner described by L spies et al., which could be due to the addition of the current front-end. While the current front-end increases the scanner linearity, it also increase the presence of noise. However the noise level of the new scanner is still lower than the Poisson noise, which is sufficient for CT applications. Furthermore, the prototype described herein had the smallest size with a much larger GDQE.

[1] R. Steadman, F. Morales, G. Vogtmeier, A. Kemna, E. Oezkan, W. Brockherde, and B. J. Hosticka, "A CMOS photodiode array with in-pixel data acquisition system for computed tomography," *IEEE J. Solid-State Circuits*, vol. 39, no. 7, pp. 1034-1043, July 2004.

[2] R. Steadman, G. Vogtmeier, A. Kemna, E. Ouossai, and B. J. Hosticka, "A High Dynamic Range Current-Mode Amplifier for Computed Tomography," *IEEE J. Solid-State Circuits*, vol. 41, no. 7, pp. 1615-1619, July 2006.

V. CONCLUSION AND CLOSING REMARKS

It will be appreciated that a monolithic CMOS CT scanner with synchronous partial quantization with high linearity, quantum-limited noise, good scalability, high fill factor with a single CMOS chip, and that does not require calibration has been described in detail herein. New system-level and circuit-level techniques enable the synchronous partial quantizer to quantize the photocurrent with constant potential well size, and as a result, the dynamic range of the scanner can be expanded with high linearity. Furthermore, only a low-resolution ADC is required to quantize the residual voltage.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

TABLE IV

PERFORMANCE COMPARISON OF CMOS CT SCANNERS

|  | Prototype monolithic CMOS CT scanner | Voltage-mode CT scanner [1] | Current-mode CT scanner [2] |
| --- | --- | --- | --- |
| Process | 0.35 µm CMOS | 1.2 µm FhG-IMS | 0.8 µm FhG-IMS |
| Pixel area (mm × mm) | 1.39 × 1.1 | 1.8 × 1.0 | 1.4 × 1.1 |
| Photodiode (mm × mm) | 1.39 × 0.83 | 1.39 × 0.83 | 1.1 × 1.0 |
| ADC | on-chip, 10 bits | External, 14 bits | NA |
| GDQE (%) | 75.5 96.8 (pixel only) | 64 | 71.4 |
| Frame rate (kHz) | 1.1 | 2.4 | 1.2 |
| Photocurrent | 6 pA-63.4 nA | 6 pA-81 nA | 17.7 pA-181 nA |
| Dynamic range (bits) | 16.7 | 17 | 16.4 |
| Linearity | 0.002%~0.06% | 0.4%~1% | 0.2%~2% |
| Noise ($pA_{rms}$) | 0.6 | 0.4 | 3 |

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A CMOS (complementary metal-oxide-semiconductor) CT (computed tomography) detector for implementing synchronous partial quantization, comprising:
   a pixel array including a plurality of pixels arranged into at least one column;
   at least one digital column bus corresponding to the at least one column;
   at least one analog column bus corresponding to the at least one column;
   at least one column processing circuit corresponding to the at least one column for processing digital and analog outputs received from the at least one digital column bus and the at least one analog column bus;
   a shift register for multiplexing outputs of at least two column processing circuits;
   a control signal generation circuit for generating controls signals for at least one pixel of the plurality of pixels, the shift register, and the at least one column processing circuit; and
   a reference generation circuit for generating at least one voltage reference for at least one of: the at least one column processing circuit and the plurality of pixels;
   wherein the at least one pixel of the plurality of pixels includes:
      a photodiode for generating a photocurrent;
      an integration capacitor, configured to increase an integrated photovoltage by being discharged by the photocurrent;
      an operational amplifier for establishing feedback to force the photocurrent to be integrated on the integration capacitor;
      a reset switch for resetting the integration capacitor during a reset phase;
      a comparator for comparing the integrated photovoltage with a reference voltage;
      a memory cell for recording the output of the comparator synchronously with a system clock;
      a circuit block for transferring a substantially fixed amount of charge from a sampling capacitor to the integration capacitor in response to a determination that the integrated photovoltage exceeds the reference voltage;
      an integration node connected to the input of the operation amplifier and to the integration capacitor;
      an analog buffer for receiving the integrated photovoltage at the end of an integration phase; and
      a switch coupled between the output of the memory cell and the digital column bus for driving the digital column bus during the integration phase.

2. The CMOS CT detector of claim 1, wherein the pixel array operates in three exclusive clock phases including a reset phase, an integration phase and an analog readout phase corresponding to three control signals including a reset control signal, an integration control signal and an analog readout control signal.

3. The CMOS CT detector of claim 1, wherein the circuit block comprises:
   a non-overlapping clock generation module for generating two non-overlapping clocks utilizing a gated output from the memory cell;
   two switches and the sampling capacitor; and
   a level shifter coupled between the integration node and the charging node of the sampling capacitor for charging the sampling capacitor according to the voltage at the integration node.

4. The CMOS CT detector of claim 3, wherein the level shifter comprises two branches of MOS diodes with two current sources for generating a substantially fixed voltage level shift.

5. The CMOS CT detector of claim 1, wherein the at least one pixel comprises:
   a current front-end coupled between the integration node and the photodiode for decoupling the photodiode capacitance from the integration node.

6. The CMOS CT detector of claim 5, wherein the current front-end comprises:
   a gain-boosted cascode transistor for decoupling the photodiode and the integration node in the reset and integration phases;
   an identical branch for biasing said photodiode during an analog readout phase; and
   a current source for expediting pixel settling during the reset phase.

7. The CMOS CT detector of claim 6, wherein the cascode transistor is turned off during the analog readout phase.

8. The CMOS CT detector of claim 1, wherein the memory cell is a 1-bit dynamic random access memory (DRAM), comprising:
   a pass transistor for receiving the comparator output by the control of the system clock;
   a capacitor for storing the comparator output;
   a reset switch for resetting the capacitor controlled by a DRAM reset signal; and
   an AND gate for gating the output of the 1-bit DRAM cell with the system clock.

9. The CMOS CT detector of claim 8, wherein the pass transistor has strong write capability, and the reset switch has weak reset capability.

10. The CMOS CT detector of claim 1, wherein the column processing circuit comprises:
    a quantizing analog-to-digital converter (ADC) coupled to the analog column bus for quantizing the photovoltage in a pixel to n bits at the end of an integration phase; and
    a column counter coupled to the digital column bus for counting a number of self-resets for pixels in the at least one column.

11. The CMOS CT detector of claim 10, wherein the column counter comprises:
    an array of m-bit static random-access-memory (SRAM) cells for storing the self-reset number of every pixel;
    an in-bit adder for receiving a digital signal from the digital column bus and for receiving digital values from the SRAM array;
    an m-bit register for latching a summed value from the m-bit adder at a falling edge of a counter clock;
    m inverters coupled to the m-bit register;
    a BIT bus coupled to one terminal of each SRAM cell including m bit lines;

a BIT* bus coupled to another terminal of each SRAM cell including m bit lines;

m switches coupled between the m-bit register and the BIT bus controlled by a column write signal;

m switches coupled between the inverters and the BIT* bus controlled by the column write signal; and m switches coupled between the BIT bus and BIT* bus controlled by an equalization signal.

12. The CMOS CT detector of claim 11, wherein one SRAM cell comprises:

two cross-coupled inverters forming two internal nodes;

a switch coupled between a first internal node and a bit line in the BIT bus controlled by an SRAM signal; and a switch coupled between a second internal node and a bit line in the BIT* bus controlled by the SRAM signal.

13. The CMOS CT detector of claim 11, wherein an SRAM signal opens an SRAM cell for both reading and writing in a counter clock cycle.

14. The CMOS CT detector of claim 11, wherein an SRAM signal opens different SRAM cells sequentially.

15. The CMOS CT detector of claim 11, wherein the equalization signal equalizes the BIT bus and the BIT* bus before an SRAM signal opens the SRAM cells.

16. The CMOS CT detector of claim 11, wherein an SRAM cell is reset by a register reset signal in the counter clock.

17. A pixel, part of a CMOS (complementary metal-oxide-semiconductor) CT (computed tomography) detector, comprising:

a photodiode for generating a photocurrent;

an integration capacitor, configured to increase an integrated photovoltage by being discharged by the photocurrent;

an operational amplifier for establishing feedback to force the photocurrent to be integrated on the integration capacitor;

a reset switch for resetting the integration capacitor during a reset phase;

a comparator for comparing the integrated photovoltage with a reference voltage;

a memory cell for recording the output of the comparator synchronously with a system clock;

a circuit block for transferring a substantially fixed amount of charge from a sampling capacitor to the integration capacitor in response to a determination that the integrated photovoltage exceeds the reference voltage;

an integration node connected to the input of the operation amplifier and to the integration capacitor; and an analog buffer for receiving the integrated photovoltage at the end of an integration phase.

18. The pixel of claim 17, wherein the circuit block comprises:

a non-overlapping clock generation module for generating two non-overlapping clocks utilizing a gated output from the memory cell;

two switches and the sampling capacitor; and a level shifter coupled between the integration node and the charging node of the sampling capacitor for charging the sampling capacitor according to the voltage at the integration node.

19. The pixel of claim 17, comprising:

a current front-end coupled between the integration node and the photodiode for decoupling photodiode capacitance from the integration node.

* * * * *